United States Patent

[11] 3,585,367

| [72] | Inventor | Ross C. Humbarger<br>Fairborn, Ohio |
|---|---|---|
| [21] | Appl. No. | 760,841 |
| [22] | Filed | Sept. 19, 1968 |
| [45] | Patented | June 15, 1971 |
| [73] | Assignee | The Monarch Marking System Company<br>Dayton, Ohio |

[54] SELF-TIMING ENCODED TAG READER
4 Claims, 16 Drawing Figs.

[52] U.S. Cl. .................................................. 235/61.11,
250/219
[51] Int. Cl. ...................................................... G01n 21/30,
G06k 7/14
[50] Field of Search .......................................... 235/61.11,
61.115, 61.12; 250/219 Q; 340/146.3

[56] References Cited
UNITED STATES PATENTS
3,173,000  3/1965  Johnson et al. ........... 250/219 (IDC)X
3,474,234  10/1969  Rieger et al. .................. 250/219 (ID) X
3,480,762  11/1969  DelVecchio ............... 250/219 (IDC) X Primary Examiner—Maynard R. Wilbur
Assistant Examiner—Thomas J. Sloyan
Attorney—Wood, Herron and Evans ABSTRACT: A label is disclosed having an aligner symmetrically disposed relative to a circular pattern of circumferentially arranged photosensible information. Also disclosed is a reader having a probe engageable with the label aligner to properly locate the information pattern relative to a scanning transducer which is radially displaced about the probe for movement in a circular scan path coextensive with the circular information pattern on the label. The reader additionally includes clock signal means which generates clock signals at a rate substantially exceeding the information scanning rate, and sample signal means responsive to the clock signal and to a start mark on the tag for generating clock signals in synchronism with the scanning of the circularly arranged information positions.

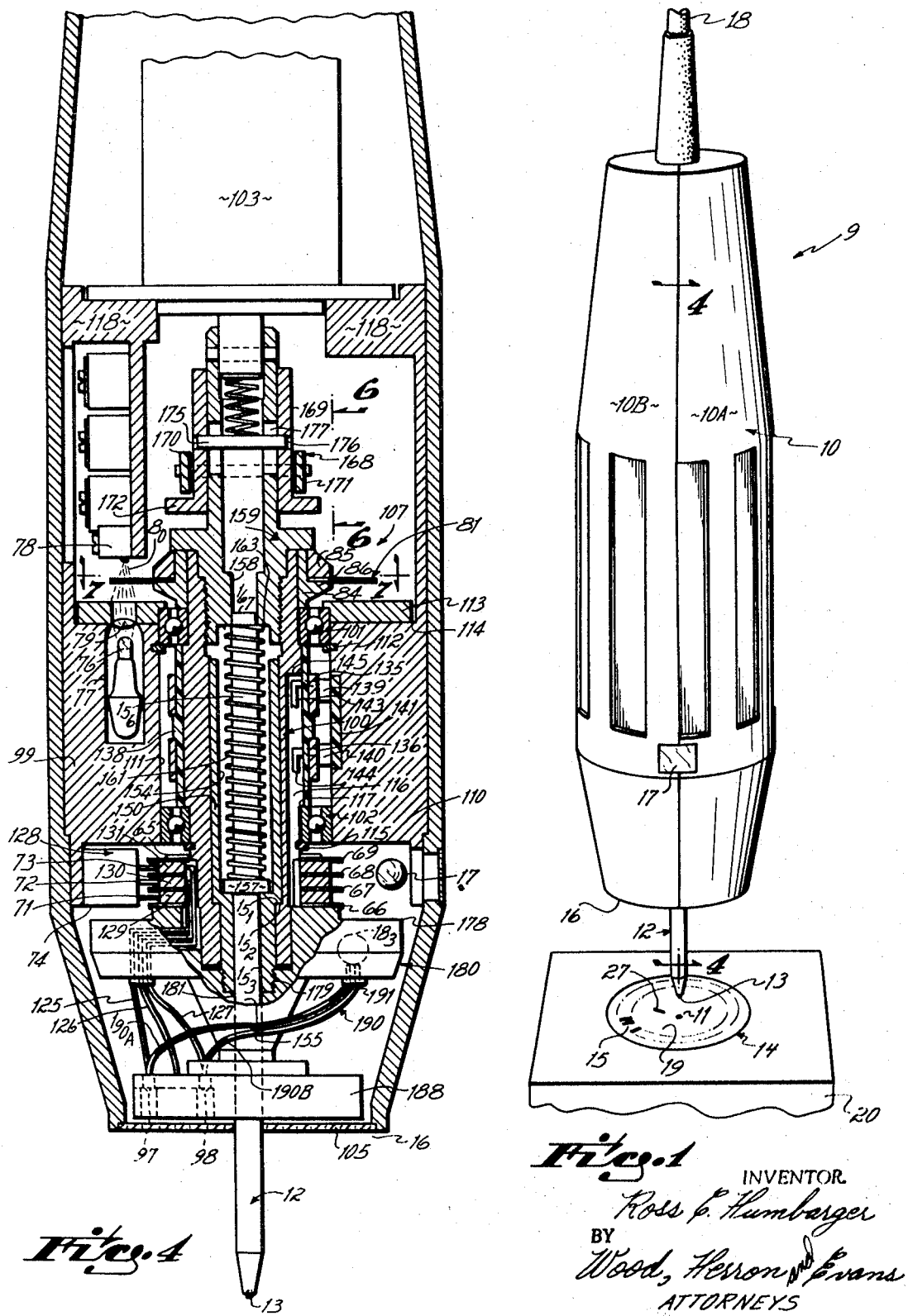

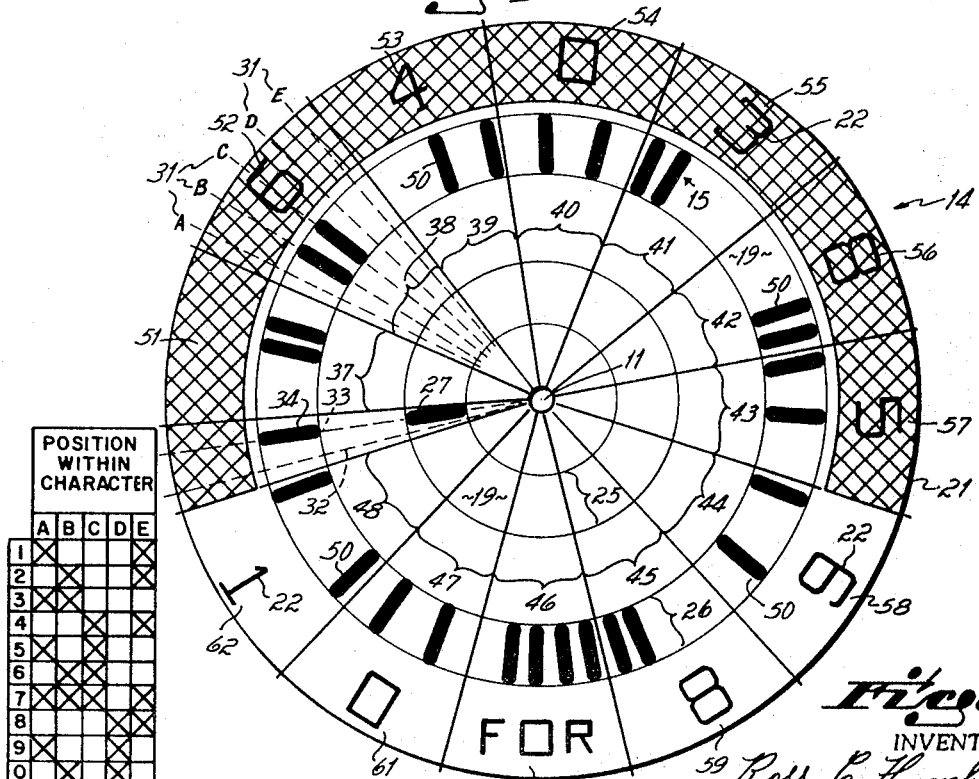

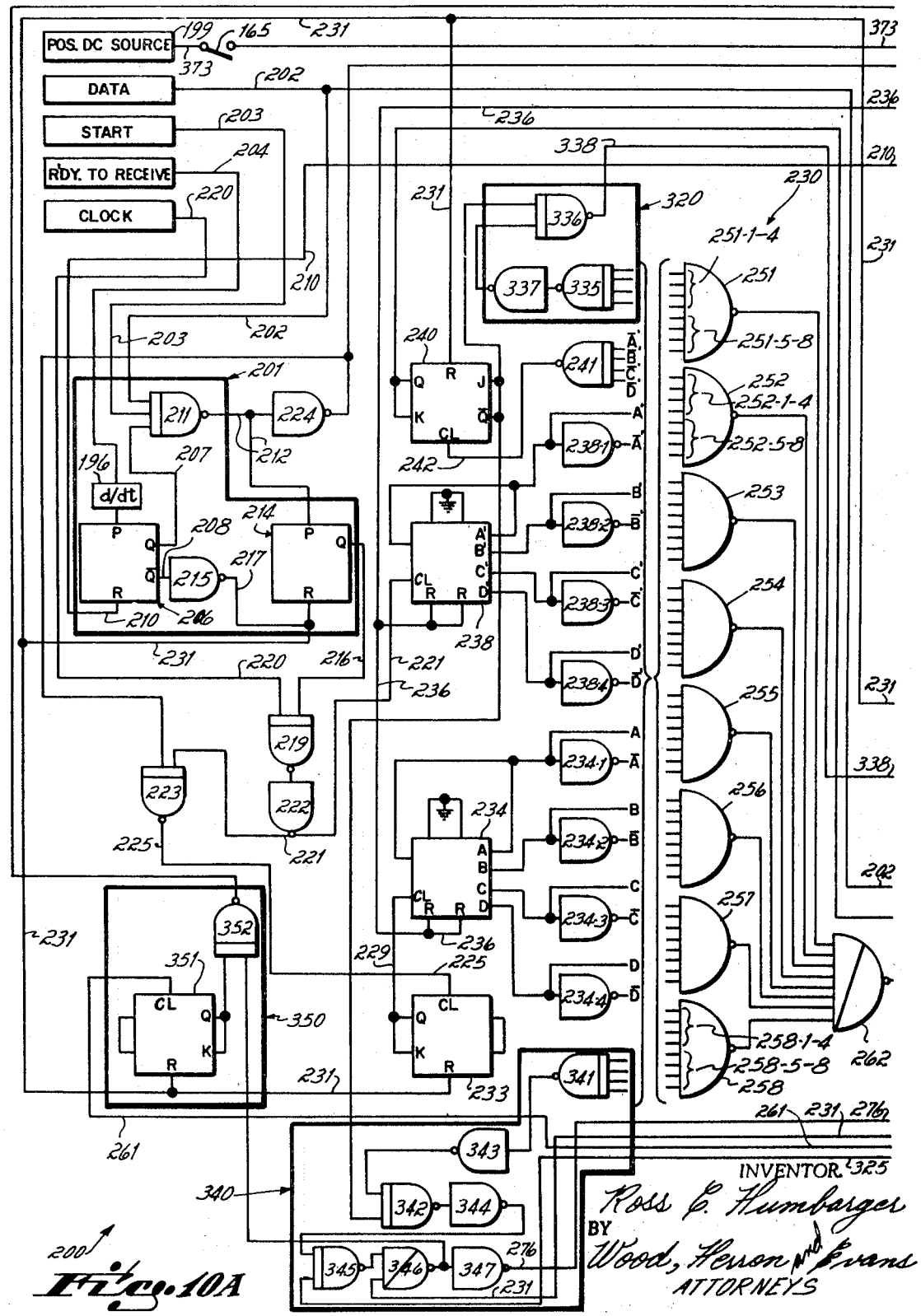

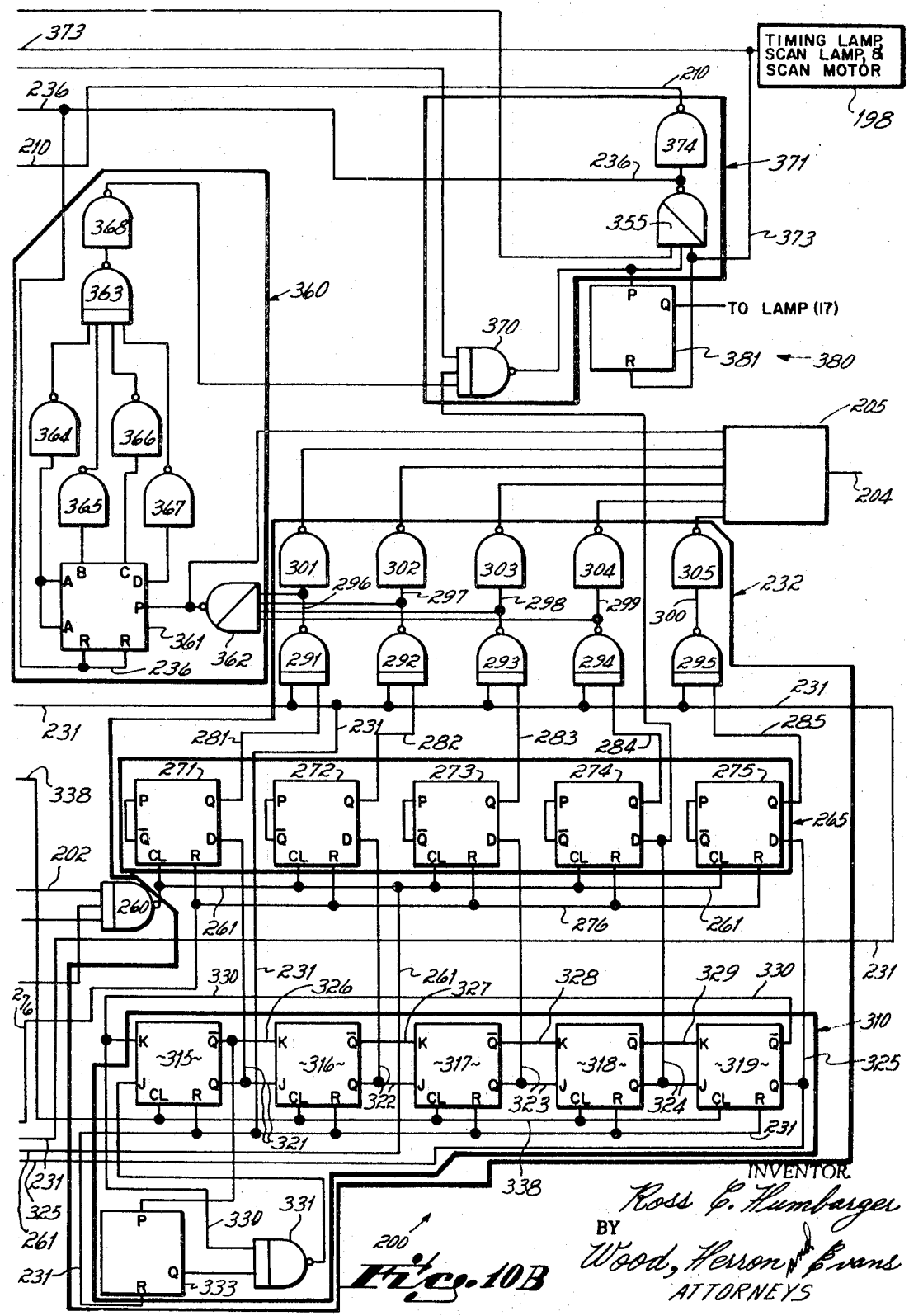

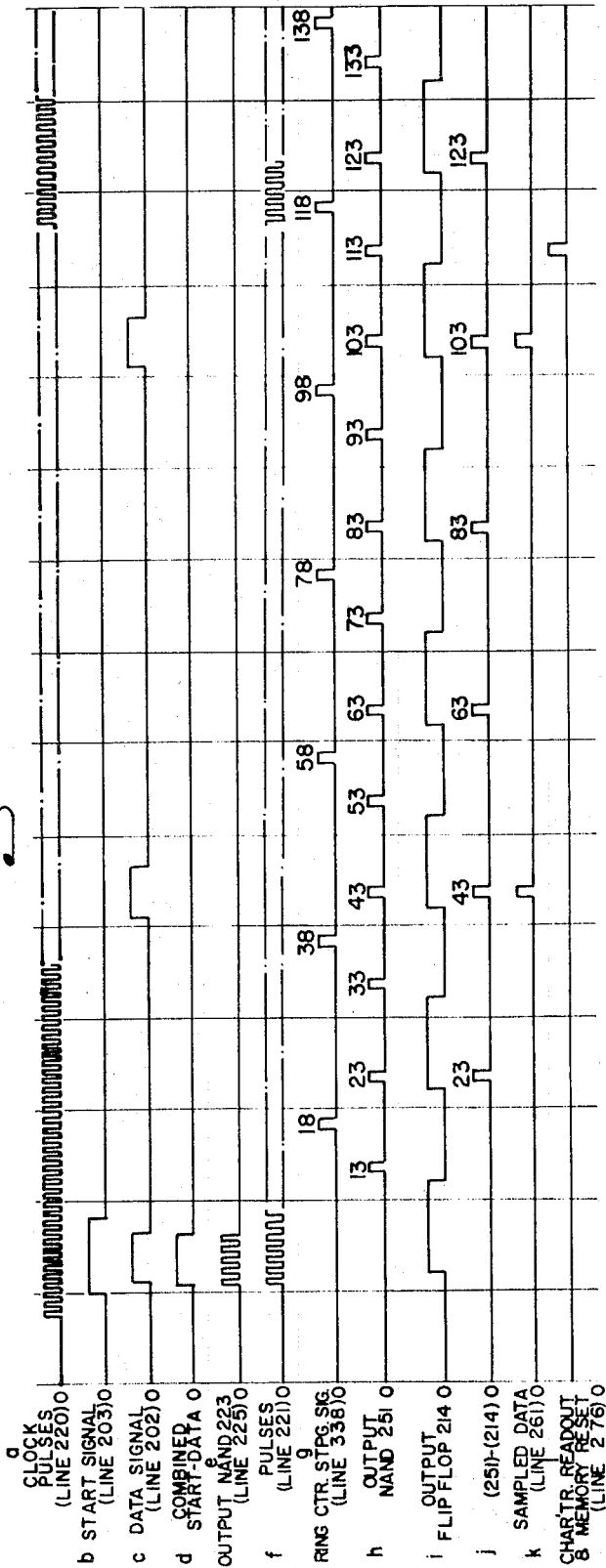
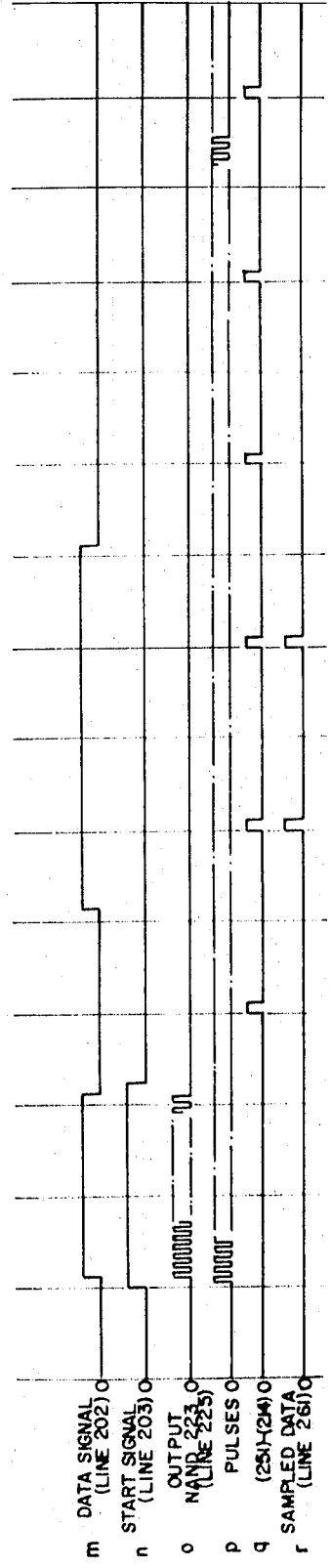
Fig. 11

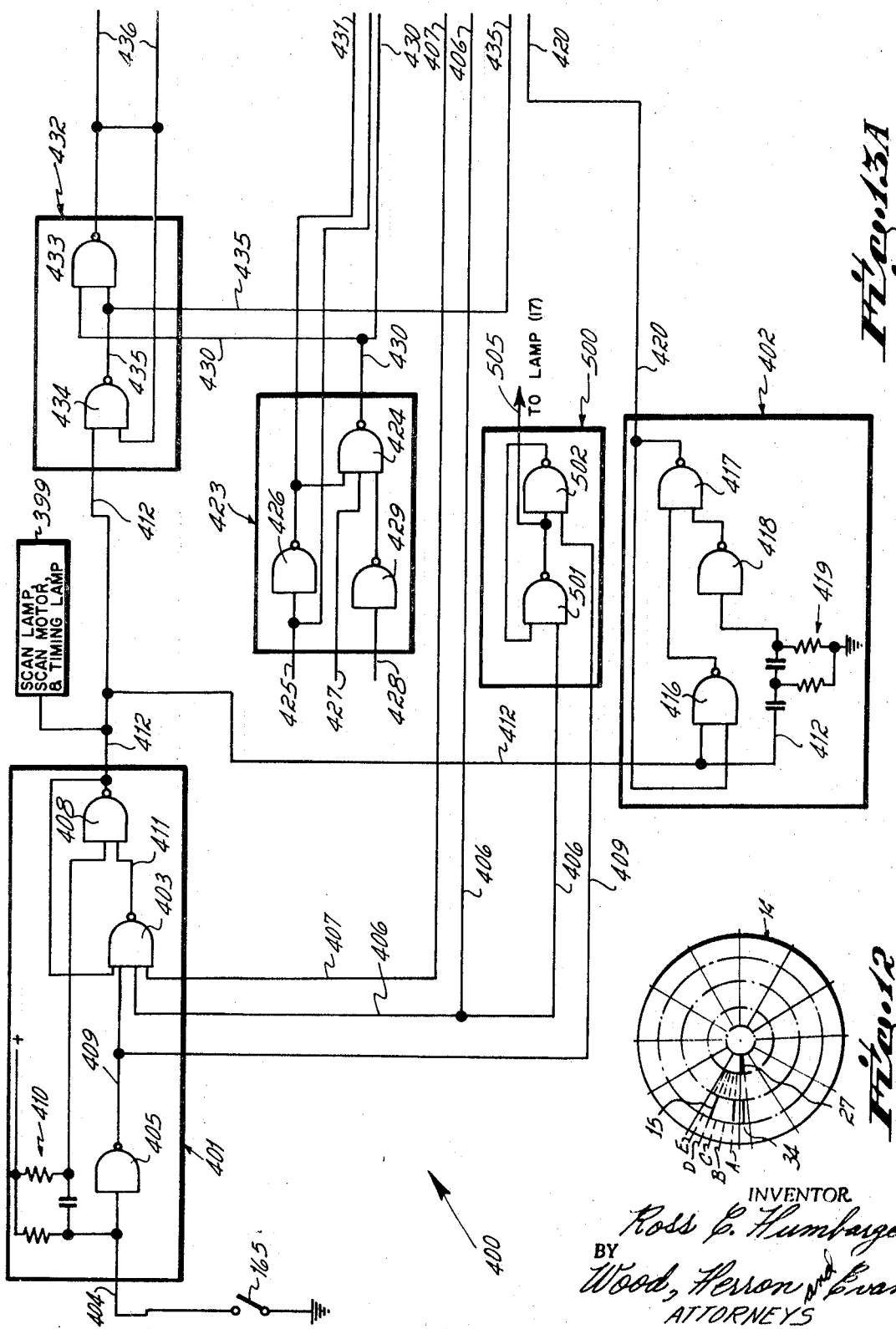

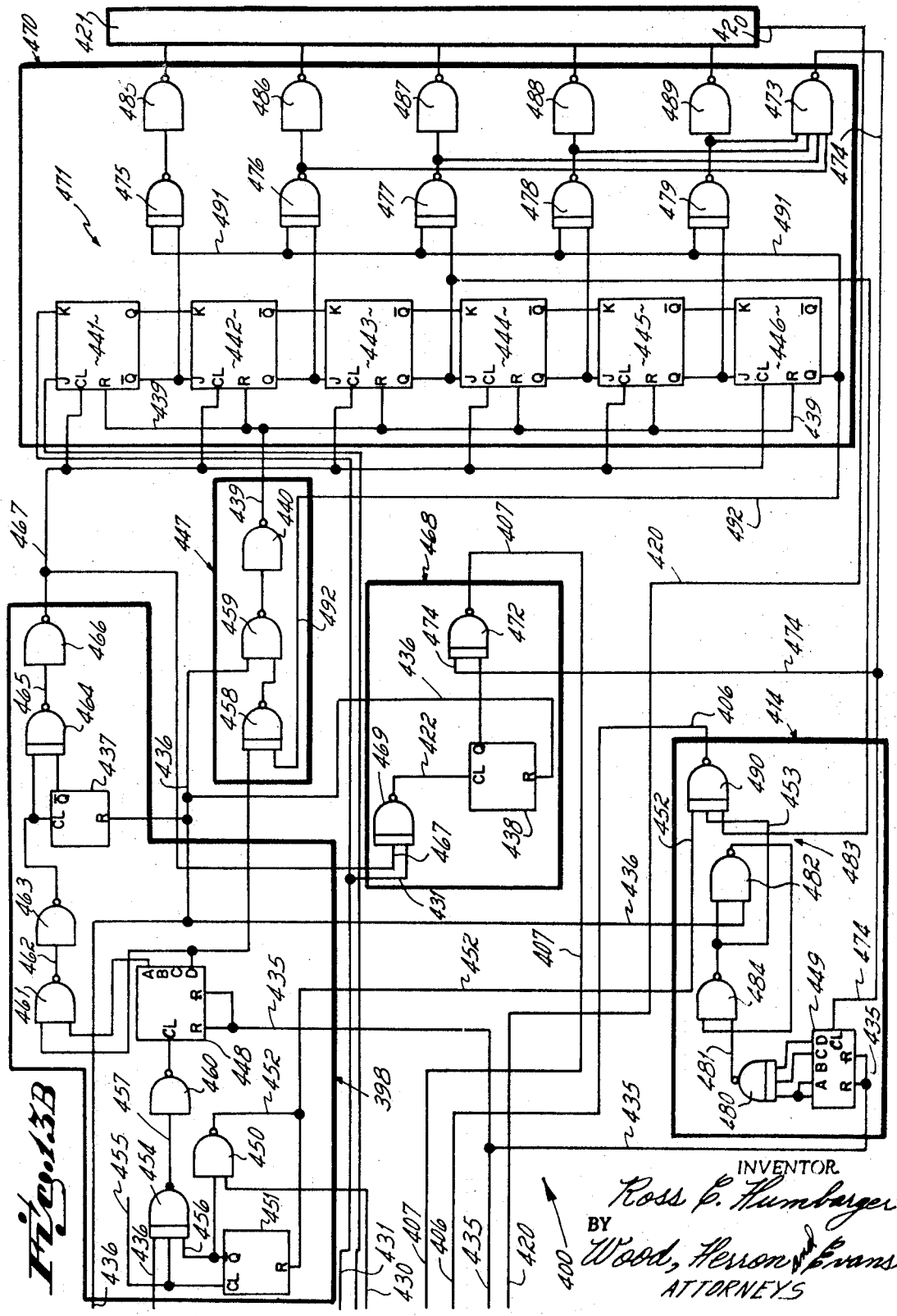

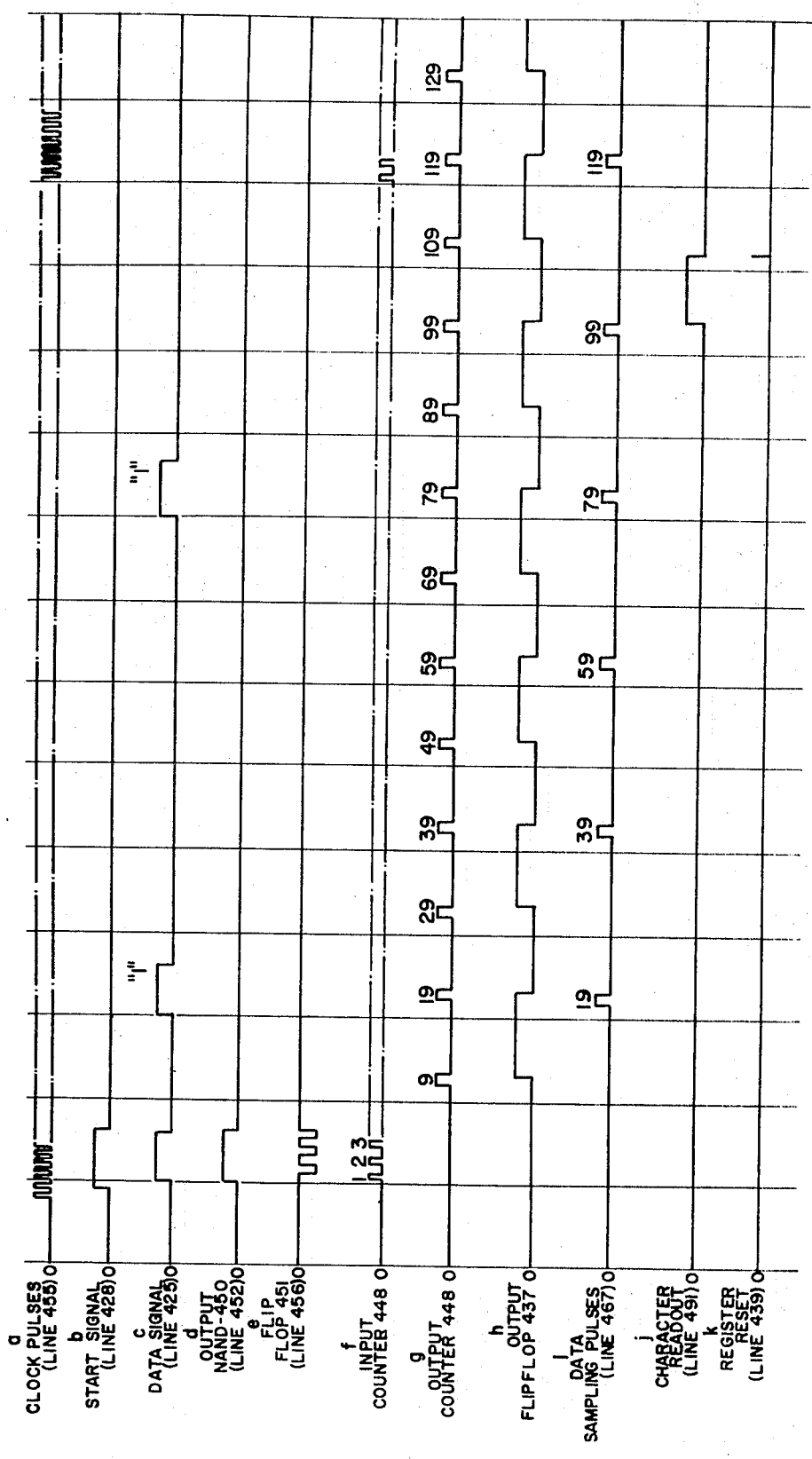

SELF-TIMING ENCODED TAG READER

This invention relates to encoded tag reading apparatus and, more particularly, to apparatus for reading merchandise tags having circularly arranged photosensible information imprinted thereon.

Broadly illustrative of the general type of tag suitable for use with the reader of this invention are the tags disclosed and claimed in the copending applications of Paul H. Hamisch for "Improved Machine Readable Merchandise Tag," Ser. No. 601,683, filed Dec. 14, 1966, of Herbert LaMers for "Interpreting System," Ser. No. 260,748, filed Feb. 25, 1963, and of Rieger et al. for "Improved Encoded Tag Reader," Ser. No. 672,629, filed Oct. 3, 1967. In each of the above applications, a tag is shown which embodies a construction fundamentally different from that employed in machine readable tags previously known in the art. Specifically, each tag disclosed is predicated on the concept of providing a central alignment hole in the tag about which machine readable information such as encoded price, description, inventory number, etc., is imprinted in the form of circularly arranged patterns of equally circumferentially spaced photosensible marks.

The merit of a tag having circumferentially spaced, circularly arranged encoded information symmetrically disposed relative to an alignment hole is that the need for careful registration between the tag and reader during reading is virtually nonexistent. To secure alignment between the tag and reader, it is only necessary to insert a suitably positioned probe, which protrudes from the reader, into the hole in the tag. This automatically aligns tag scanning transducers located in the reader with the circular rings or patterns of encoded machine readable information imprinted on the tag. Precise angular orientation of the tag and the probe is unnecessary. Because of this ease of registration, tags of this type have come to represent a fundamental advance in the encoded machine readable tag field.

Tags disclosed in the above-referenced copending Hamisch and LaMers applications having the combined alignment hole and symmetrically disposed information, while solving the alignment problem, have resulted in a tag format which does not permit an optimum reduction in tag size and cost. The Hamisch and LaMers tags have typically included circularly arranged, circumferentially spaced timing data, in addition to circularly arranged, circumferentially spaced machine readable information marks in the nature of pricing data, inventory number, article description, etc. In operation, the timing data is sensed by the reader in predetermined relation to the sensing of the encoded information or pricing data. This provides a series of synchronous timing signals useful in processing the encoded information or pricing data contained on the tag. As one skilled in the art will readily appreciate, the need for imprinting a circular pattern of timing marks on the tag necessarily increases the cost of the tag. This cost increase is manifested in at least two different respects. First, the tag stock necessary to produce such a tag is larger inasmuch as it must be sized to include the timing data as well as the information data. Second, the actual expense of imprinting the tag is larger by reason of the photosensible timing data since a printing operation is involved which requires the use of specialized equipment adapted to accurately print in a circular pattern, increased ink cost, etc. While the extra cost attributable to the need for imprinted timing data may, on a per tag basis, be relatively insignificant, the total additional cost to a typical large scale user of, for example, 20 million tags per year, is not insignificant.

The above-referenced copending Rieger et al. application discloses and claims a reader which eliminates the need for imprinting timing data on tags of the general type described, thereby permitting a reduction in tag size and printing cost. In accordance with the principles of the Rieger invention, a self-timed tag reader, that is, one which is capable of generating timing signals internally, is provided, thereby dispensing with the need for timing marks on the tag itself. The Rieger et al. self-timed tag reader includes a light source adapted to direct a beam of light on a timing transducer and a light beam interrupter selectively positionable in the beam path. The light beam interrupter is in the form of a timing disc having a plurality of circularly arranged slots corresponding in number and spacing to the information bit positions on the tag. The slotted disc is driven through a selectively operable clutch by the drive means used to rotate the scanning transducer which reads the information.

In operation, when the scanning transducer senses the beginning of the encoded information, the clutch is engaged and the timing disc begins rotating, causing periodic interruption of the light beam and the consequent generation of timing signals. The periodicity of the interruption, and hence of the timing signals, is equal to the scanning rate of the information bits due to the manner in which the number and spacing of the timing slots and the speed of the rotating timing disc are selected. The periodicity of the interruption, and hence of the timing signals, are also in exact synchronism with the sensing of the information data due to the fact that the rotation of the timing disc, and hence generation of the timing signals, initiates the instant the beginning of the message is sensed.

The Rieger et al. reader, although its self-timing capability eliminates the need for the imprinting of timing data on tags, has been found to have certain shortcomings in some applications by reason of the use therein of a clutch to selectively drive the timing disc. For example, where compactness and small reader size are required, the use of a clutch unnecessarily increases the size of the reader, as well as adds to its weight. In one form of the Rieger et al. reader, the clutch includes an electromagnet mounted and operated such that when energized in response to sensing of the beginning of the message by the reader, its armature selectively disengages a peripheral tooth on the timing disc, enabling the timing disc to be driven with the scanning assembly through a friction drive arrangement. Thus, by eliminating the need for the clutch, the reader can, to the extent of the electromagnet size and weight, be made more compact and its weight reduced.

Another disadvantage of the Rieger et al. reader, stemming from the need therein for a clutch, is the requirement that the periphery of the timing disc be toothed. This adds an extra step to the reader manufacturing operation, increasing its cost. The teeth also are a source of wear, and as such increase the likelihood of failure, thereby reducing the overall reliability of the reader, and hence of the tag reading operation. Another disadvantage associated with the clutch is the need for a friction drive arrangement between the timing disc and drive means. This, like the toothed timing disc, adds to reader assembly time and introduces a wear point, thereby increasing both the cost and unreliability of the reader.

It has been an objective of this invention to eliminate the need for clutch assemblies in readers of the general type disclosed and claimed in the Rieger et al. application, and in so doing avoid the disadvantages attendant such clutches, for example, unnecessary bulk and weight due to additional parts such as electromagnets, extra manufacturing steps which increase assembly costs, and additional wear points which tend to reduce overall reliability. This objective has been accomplished in accordance with the principles of this invention by adopting a unique approach to the timing problem which involves (a) using a clock disc which can be fixed to the scanning assembly and which is capable of generating clock signals throughout the entire period of movement of the rotating scanning assembly and at a clock signal rate exceeding, by a factor of N, the rate at which the encoded information is scanned by the scanning transducers, and (b) the use of counting means which is responsive to the sensing of a start mark on the tag corresponding to the beginning of the encoded information for counting only those clock signals generated after the start mark is sensed and, as a consequence thereof, generating periodic data sampling signals coincident with every $n$th clock signal counted and in synchronism with the data scanning.

In operation, when a tag is engaged with the reader and brought to a read station, the scanning assembly initiates rotation. This in turn begins rotation of the data scanning transducers, and the clock disc which produces the clock signals. The clock signals generated prior to the angular point in the scan path where the start mark is sensed are not utilized, the counting means being unresponsive thereto. However, once the point in the scan path is reached where the start mark is sensed, the counting means begins counting the clock signals. Every time a count of $n$ is reached, a data sampling signal is produced. Since $n$ clock signals are generated for every data bit position on the tag, the sampling signals produced every $n$th clock count occur at a rate of one per data bit position. Additionally, since the counting of the clock signals starts with the sensing of the start mark, which sensing is $n$ clock signals prior to the first data position by reason of the fixed drive between the clock ring and data sensing transducers, the first sampling signal produced at the $n$th clock count occurs in synchronism with the scanning of the first data position following the start mark. Likewise, subsequent sampling signals produced at $n$ clock count intervals occur in synchronism with the sensing of subsequent data positions. Thus, regardless of variations in the rotational speed of the scanning assembly or the initial angular position of the start mark relative to the data sensing transducers, the sampling signals are always generated in synchronism with data position sensing.

Other objectives and advantages of this invention will be more readily apparent from a detailed description of the invention taken in conjunction with the accompanying drawings in which:

FIG. 1 is a perspective view of a preferred embodiment of the tag reader of this invention, showing its use in connection with reading a tag on an article of merchandise.

FIG. 2 is one form of machine readable tag capable of use with the reader of this invention.

FIG. 3 is a preferred coding chart suitable for use in encoding a tag.

FIG. 4 is a cross-sectional view taken along line 4–4 of FIG. 1 showing the general relationship of the principal components of the tag reader of this invention.

FIG. 5 is a vertical cross-sectional view taken through the scanning phototransducers and the lower ends of the illuminating optical fibers.

FIG. 6 is a cross-sectional view taken along line 6–6 of FIG. 4.

FIG. 7 is a plan view of the timing disc.

FIG. 8 is an enlarged plan view of a portion of the timing disc of FIG. 7, showing the relationship of the peripheral optical slots.

FIG. 9 is a plan view of a tag useful in conjunction with the description of the operation of the embodiment of the invention depicted in FIGS. 10A and 10B.

FIGS. 10A and 10B collectively are a schematic diagram of one preferred form of logic circuit suitable for use with the reader of this invention.

FIG. 11 is a plot of the waveform, as a function of time, of signals at a number of points in the circuit of FIGS. 10A and 10B.

FIG. 12 is a plan view of a tag useful in conjunction with the description of the operation of the embodiment of the invention depicted in FIGS. 13A and 13B.

FIGS. 13A and 13B collectively are a schematic diagram of another preferred form of logic circuit suitable for use with the reader of this invention.

FIG. 14 is a plot of the waveform, as a function of time, of signals at a number of points in the circuit of FIGS. 13A and 13B.

GENERAL DESCRIPTION

As shown in FIG. 1, the preferred embodiment of this invention includes a tag reader 9 having a housing 10 which encloses the various operating components of the reader to be described in detail hereafter. The housing 10 is preferably formed in two complimentary half-sections 10A and 10B, fabricated of cast aluminum, molded plastic or other suitable lightweight material, and contoured to permit it to be comfortably grasped by the user's hand.

Projecting from the lower end of the housing 10 of the reader 9 is a retractable projection, plunger or probe 12. The lower end or tip 13 of the probe 12 is adapted to engage an aligner, such as a centrally disposed hole 11, formed in a tag 14 which is attached to merchandise 20, for example, articles on sale in a department store. Engagement of the tip 13 and hole 11 permits circularly arranged machine readable or photosensible information 15, such as the price of the merchandise 20 and a photosensible start mark 27 imprinted on a surface 19 of the tag 14 to automatically register with concentric circular scan paths of a pair of suitable circularly movable scanning phototransducers (not shown in FIG. 1) located within the lower portion of the housing 10 when the tag is positioned at a read station 16, that is, when the information-bearing surface 19 of the tag 14 and the lower face 16 of the housing are relatively moved into contact.

The lower central section of the housing 10 has a flush mounted indicating lamp 17. The lamp 17 is adapted to become illuminated when the reader 9 has completed reading a tag 14 properly positioned at the read station 16, thereby providing the operator with a visual indication that the tag reading cycle has been completed. The upper end of the housing 10 is provided with an electrical cable 18 in which are positioned the necessary wires for providing power to the various operating components of the reader 9, as well as for permitting the information 15 read from the tag 14 to be output to a suitable utilization device, such as a cash register or centrally located data processing apparatus or computer.

In operation, the user grasps the central contoured section of the housing 10 of the reader 9 and inserts the tip 13 of the probe 12 in the central alignment hole 11 formed in the tag 14. The reader 9 and tag 14 are relatively moved toward each other, preferably by moving the reader downwardly toward the tag, urging the probe 12 inwardly and positioning the information-bearing surface 19 of the tag at the read station 16. With the tag 14 and reader 9 so oriented, the circularly arranged information 15 which is symmetrically disposed about the centrally positioned hole 11 and the start mark 27 are automatically properly registered with the circular scan paths of the phototransducers (not shown in FIG. 1) contained in the reader. In addition, the probe 12 is retracted. This provides an input to the reader control or logic circuit (not shown in FIG. 1) for the purpose of initiating circular scanning motion of the transducers, and thereby commencing the tag reading operation.

Upon completion of the tag reading operation, which occurs when the transducers have fully scanned the circularly arranged information 15, the indicating lamp 17 becomes illuminated, visually advising the operator that the tag reading operation has been completed. The operator then removes the reader from the operative reading position with respect to the tag 14, preferably by lifting the housing 10 upwardly.

TAG

Considering in more detail a preferred form of tag 14 suitable for use with the reader 9 of this invention, reference is made to FIG. 2. Referring to this figure, tag 14 is shown to include a circular sheet of printing stock 21 constituting the body of the tag. The printing stock 21 is preferably constituted of paper, although other materials may be used, such as light gauge metals or foils, wood strips, plastic sheets and the like. The printing stock 21 is provided with the information-bearing surface 19 which is adapted to receive an imprint of the photosensible information 15 and, if desired, a humanly intelligible translation 22 of the information. Preferably, the information-bearing surface 19 is integral with the print stock 21, although it is contemplated that the information-bearing surface 19 may comprise, for example, a thin piece of paper laminated or adhered to a suitable support material or substrate such as wood, plastic, metal and the like, the paper and substrate in combination comprising the tag. Alternatively, the information-bearing surface 19 may comprise a print receptive surface on the merchandise itself or on a package in which the merchandise is contained.

The humanly intelligible translation 22 may be omitted under certain conditions. For example, if it becomes necessary to reduce the size of the tag to a minimum, the translation may be omitted and the size of the tag reduced accordingly. Typically, a tag such as that shown in FIG. 2 which includes the translation 22 is approximately 1¼ inches in diameter.

Also included in the preferred embodiment of the tag 14 is the aligner 11, which preferably is a through hole, although it may be in the form of a blind hole, depression or dimple which does not extend entirely through the print stock 21. The function of the hole 11 is to engage the tip 13 of the projecting probe 12 for the purpose of automatically registering the circularly arranged information 15 with the transducers of the reader 9 when the tag 14 is at the read station 16.

The machine-readable information 15 includes an inner ring 25 containing the start mark or bit 27 and an outer information or data ring 26. The information or data ring 26 is divided into 62 equally circumferentially spaced and contiguous information or data bit positions 31, each of which is adapted to receive a photosensible mark 50. Of the 62 information bit positions 31, one is left blank and one is used in combination with start mark 27 to control the reader. Specifically, information or data bit position 32 is left blank and information or data bit position 33, which is aligned with the start mark or bit 27, is provided with a photosensible mark 34. Information bit position 32 is left blank merely because its use is unnecessary in an information format having 12 characters, each with five information bits, to be described. The photosensible mark 34 in combination with the start mark 27 establishes a reference for the beginning of the information 15, and when sensed by the transducers of the reader 9, initiate the reading operation. The remaining 60 information marks of ring 26 are divided into 12 contiguous character groups 37—48 each having five information or data bit positions A—E.

The character groups 37—48 are encoded by placing the photosensible marks 50 in the various information bit or data positions 31 as dictated by the particular code being used. Preferably, the character coding scheme depicted in FIG. 3 is utilized. In the preferred coding scheme depicted in FIG. 3, the information or data bit positions 31 have positionable significance in the sense that the positions A—E of each character group 37—48 are weighted. Specifically, the first data position A of each character group 37—48 is assigned a value of 1, the second data position B of each character group is assigned a value of 2, the third data position C of each character group is assigned a value of 4, the fourth data position D of each character group is assigned a value of 8, and the fifth data position E of each character group is assigned a value of 0, the fifth position being a check position.

If, for example, it is desired to encode a character group with the number 1, a photosensible mark 50 is placed in data position A and data position E. Similarly, if a character group is to be encoded with the number 2, a mark 50 is placed in the second data position B and the fifth data position E. In any given character group the value of the number encoded is equal to the sum of the values associated with those bit positions in which marks are placed, except for the number 0 which is encoded by placing a mark in bit positions B and D and except for the numbers 11—15 which have other than numerical significance. Illustrative of such nonnumerical code significance is character group 46 in which the photosensible marks correspond to the word "FOR," and the character group 37 in which the marks correspond to the words "-START MESSAGE."

As those skilled in the art will understand, it is not necessary that all of the 12 character groups 37—48 be encoded. Nor is it necessary that the character groups be encoded in accordance with the code depicted in FIG. 3. It is contemplated that other coding arrangements may be used such as conventional binary wherein the bit positions A, B, C, D and E of each code group correspond to the weighted binary values 1, 2, 4, 8 and 16, respectively. Further, it is not necessary that the encoding be numerical. Alphabetical or alpha-numerical coding may be used, as well as symbolism. It is also not necessary that the 60-bit positions of information ring 26 having encoded data be divided into 12 5-bit characters. Other character groupings are possible, such as 15 4-bit characters, 10 6-bit characters, etc.

The humanly intelligible translation 22 of coded information in ring 26 is divided into 12 juxtaposed character positions 51—62 corresponding to the 12 character groups 37—48 of the information ring. Assuming the number 640385, an inventory number identifying a merchandise item, is encoded in the character groups 38—43, the character positions 52—57 contain, as shown in FIG. 2, the humanly intelligible Arabic numerals "6," "4," "0," "3," "8" and "5." Likewise, if the bit positions 48—44 are encoded with the information "10 FOR 89," which may for example indicate the price of the merchandise, the character positions 62—58, respectively, will bear the humanly intelligible Arabic numerals "1" and "0," the word "FOR," and the Arabic numerals "8" and "9."

READER

Considered in more detail, the reader 9, which is shown more particularly in FIGS. 4—7, includes the housing 10 enclosing a stationary frame or support 99 and a generally symmetrical scanning assembly 100. The assembly 100 is disposed coaxially relative to the probe 12 and is mounted in frame-supported ball bearings 101 and 102 for rotation by a stationarily mounted scan motor 103. The motor 103 is connected by wires (not shown) to logic circuits 200 or 400, as the case may be, for energization when the probe 12 is inserted into the reader housing 10. The scanning assembly 100 carries in its lower end suitable phototransducing means 97 and 98, to be described. The phototransducing means 97 and 98 move in concentric circular scanning paths in registration with the information ring 26 and the ring 25 containing the start mark 27, respectively, of tag 14 properly positioned at the read station 16, that is, with its information-bearing surface 19 in contact with a stationarily mounted transparent annular window 105. Associated with the central portion of the scanning assembly 100 is timing means 107 which, in a manner also to be described, generates a predetermined number of timing or clock pulses for each data position 31 of the information ring 26 in synchronism with the sensing of the data positions by the phototransducer 97.

The frame or support 99, which is secured to the housing 10 by fasteners (not shown), is a uniquely configured casting, molding or stamping having a plurality of suitably positioned locating surfaces for supporting and positioning the various components of the reader in operative relationship with each other. The frame 99, more specifically, includes a lower portion 110 having a central bore 111 therein configured to accommodate the rotatable scanning assembly 100. Positioned within the bore 111 at its upper end is the bearing 101 which locates and rotatably mounts the upper end of the scanning assembly 100. A circular clip 112 seated in a circumferential groove in the bore 111 locates the lower portion of bearing 101 while an annular disc or collar 113 secured to the frame surface 114 locates and retains the bearing. Positioned within the bore 111 at its lower end is the bearing 102 which locates and rotatably mounts the lower end of the scanning assembly 100. A circular clip 115 secured in a circumferential groove formed in an outer sleeve 116 of the scan assembly 100, in combination with a shoulder 117 also formed on the outer sleeve, locates and mounts the bearing 102. The frame 99 also includes an upper portion 118 which mounts the scan motor 103.

The scanning assembly 100 considered in more detail includes, as shown particularly in FIG. 4, the generally hollow cylindrical sleeve 116 having a stepped diameter outside surface. The sleeve 116 is mounted for rotation with the inner races of the ball bearings 101 and 102 in response to rotation by the scan motor 103.

A pair of slip rings 135 and 136, as shown in FIG. 4, are positioned about the sleeve 116 and separated from each other and from the outer surface of the sleeve by a suitably configured insulating spacer 138 which is secured to the outer surface of the sleeve. The slip rings 135 and 136 cooperate with the free ends of suitably disposed stationary leaf spring contacts 139 and 140, the other ends of which are secured in a stationary insulative support 141 mounted in the frame section 110. Electrically connected to the slip rings 135 and 136 are wires 143 and 144, respectively, which extend downwardly in a vertical slot 145 formed in the periphery of the sleeve 116 for ultimate connection to illuminating means or scan lamp 183, for irradiating the surface 19 of a tag 14 located at the read station 16 in a manner to be described. The contacts 139 and 140, in addition to being in electrical contact with the slip rings 135 and 136, are also electrically connected to the associated logic circuit 200 or 400, as the case may be, by suitable wires (not shown) enabling power to be transmitted to the illumination means or scan lamp 183 when the probe 12 is inserted into the reader housing.

A stepped outside diameter lower inner sleeve 150, as shown in FIG. 4, is positioned within the hollow sleeve 116. The inner sleeve 150 has an externally threaded lower end which interfits and engages an internally threaded bore 179 of a transducer mounting block 180 for securing the sleeves 116 and 150 relative to the block. The lower inner sleeve 150 has an external shoulder 151 which cooperates with an internal shoulder 152 formed on the sleeve 116 for properly locating the sleeves 116 and 150 with respect to each other. The sleeve 150 further includes a small diameter lower bore 153 and a large diameter upper bore 154.

As depicted in FIG. 4, the probe 12, in addition to the tip 13, includes a lower shaft portion 155 and an upper shaft portion 156 separated by a larger diameter portion or collar 157. The lower shaft portion 155 of the probe 12 is located by, and axially shiftable within, the small diameter bore 153 of the lower inner sleeve 150. The upper shaft portion 156 of probe 12 is located by, and axially shiftable within, a bore 158 of an upper inner sleeve 159. A compression spring 161 is placed about the upper shaft portion 156 of the probe 12 between a shoulder 163 of sleeve 159 and the collar 157 for biasing the probe 12 downwardly to the extended probe position shown.

Cooperating with the upper end 167 of the probe 12 is a probe switch 165 stationarily mounted by a bracket 166 to the frame 99, as shown in FIG. 6. The switch 165 has a vertically shiftable, downwardly biased actuating button 165A adapted to be shifted upwardly to complete an electrical circuit through the switch when the probe 12 is inserted into the reader as a consequence of placing a tag 14 at the read station 16. Upward movement of button 165A for switch actuation in response to probe insertion is accomplished by means of a pivotal yoke 168, and a vertically shiftable sleeve 169 slideably encircling the sleeve 159. The yoke 168 has legs 170 and 171, which at a point intermediate their ends extend closely adjacent the periphery of sleeve 169 and in overlying relationship to a flange 172 extending radially from the bottom end of the sleeve. At one end the yoke legs 170 and 171 are pivotally mounted by a pin 173 to a frame 99. At the other end of yoke legs 170 and 171 are joined by a central web or lip 174 which underlies the switch actuating button 165A. Lip 174 is adapted to vertically shift the button when the yoke 168 is pivoted by engagement of the sleeve flange 172 in response to upward movement of probe 12. A transverse pin 175 with ends anchored in holes 176 formed in sleeve 169 extends through diametral oversized slots 177 in sleeve 159.

In operation, when a tag 14 is brought to read station 16, the probe 12 is urged into the reader housing, causing the upper end 167 of the probe to abut and move upwardly the transverse pin 175. Vertical shifting movement of pin 175 raises sleeve 169, which in turn causes flange 172 to abut and pivot clockwise yoke legs 170 and 171, lifting lip 174. Elevated lip 174 abuts and shifts button 165A, actuating switch 165. The switch 165 is suitably connected in logic circuits 200 and 400 for providing an electrical signal when the probe position is changed between a retracted position and an extended position which, among other things, is used to control energization of the scan motor 103 and scan lamp 183.

The transducing section of the reader 9 which is contained in the lower portion of the scanning assembly 100 includes the mounting block 180. The block 180, as shown in FIG. 4, has a small diameter bore 181 within which the lower portion 155 of the probe 12 is located and axially shiftable, and the large diameter bore 179 within which is threaded the lower portion of the sleeve 150 for locating the block 180 in its operative position. Formed in an upper radially extending portion 178 of the block 180 is a cavity (not shown) which receives the scan lamp 183. The cavity and lamp 183 function as a source of illumination for irradiating the information-bearing surface 19 of the tag 14 via a fiber optic means 190 to be described. Within suitable slots formed in the radial portion 178 of block 180 are the lower ends of the pair of wire conductors 143 and 144 which interconnect the lamp 183 and the slip rings 135 and 136, respectively, for providing the lamp 183 with the necessary electrical power.

The fiber optic means 190 include a set of illuminating optical fibers 190A and 190B which transmit light from the lamp 183 to the information-bearing surface 19 of a tag 14 properly located at the read station 16. The illuminating optical fibers 190A and 190B at their upper end 191 are grouped together and terminate at the cavity for the lamp, adjacent the lamp 183 where they are suitably clamped in position. As best seen in FIG. 5, the illuminating optical fibers 190A and 190B at their lower ends are divided into two separate groups 192A and 192B, and 193A and 193B. The groups 192A and 192B, and 193A and 193B terminate in radially disposed scanning apertures 194A and 194B, and 195A and 195B formed in a disc 188 positioned at the read station 16. The disc 188 is secured to the lower extremity of the block 180 parallel to the transparent window 105.

The scanning apertures 194A, 194B, 195A and 195B are radially positioned with respect to the probe 12 such that when a tag 14 is properly aligned and positioned at the read station 16, optical fiber groups 190A and 190B illuminate the information ring 26 and the ring 25 containing the start mark 27, respectively.

The phototransducers 97 and 98 are mounted in cavities 120 and 121 formed in disc 188 and optically communicate with the information ring 26 and start ring 25 of a tag 14 positioned at read station 16 via funnel-shaped bores 122 and 123 interconnecting the cavities 120 and 121 with sensing apertures 196 and 197 located adjacent the window 105. The sensing apertures 196 and 197 are located intermediate the scanning apertures 194A and 194B, and 195A and 195B. The phototransducers 97 and 98 may be of any suitable type. Phototransducers of the phototransistor type manufactured by Texas Instruments, Incorporated, and designated Model No. LS-600 have been found to be satisfactory.

As shown in FIGS. 1 and 5, electrical connections to the phototransducers 97 and 98 are preferably provided by means of electrical wires 125, 126 and 127, and a slip ring and brush assembly 128. The wires 125 and 127 have their lower ends connected to different ones of the phototransducers 97 and 98 and their upper ends connected to conductive slip rings 129 and 131, respectively. Wire 126 at its lower end is connected to the other terminal of each of the phototransducers 97 and 98 and at its upper end is connected to slipring 130. The conductive rings 129—131 are insulated from each other and from the block 180 and an annular spacer 65 positioned about the sleeve 116, and by annular insulative discs 66, 67, 68, and 69. Cooperating with the conductive rings 129, 130 and 131 are the free ends of conductive wire brushes 71, 72 and 73 whose opposite ends are secured in an insulative brush holder 74 stationarily mounted to the frame 99. The brushes 71—73 are connected, in a manner to be described, to the logic circuits 200 and 400 depicted in FIGS. 10 and 13 for transmitting signals between the transducers 97 and 98 and the logic circuits.

Two illuminating fiber optic groups 190A and 190B and two phototransducers 97 and 98 are provided in the embodiment shown. In the event that it is desired to provide an optional information ring on the information-bearing surface 19 of the tag 14 intermediate rings 25 and 26, an additional fiber optic illuminating group and phototransducer may be provided; in which case, an additional slipring and brush are needed in the slipring and brush assembly 128.

The timing means 107 for generating timing signals in synchronism with the sensing of the circularly arranged photosensible mark receiving positions 31 and the start mark 27, which is depicted more particularly in FIGS. 4, 7 and 8, includes a stationary source of light or lamp 76 mounted in a cavity 77 formed in frame 99, and a phototransducer 78 also stationarily mounted on frame 99. The lamp 76 is connected by means (not shown) to the logic circuits 200 and 400 to permit energization of the lamp when the probe is inserted into housing 10. The transducer 78 preferably is of the same type as transducers 97 and 98, although others may be used if desired, and is connected by means (not shown) to the logic circuits 200 and 400 to provide timing or clock signals. The lamp 76 and the phototransducer 78 are disposed such that a beam of light 80 emanating from the lamp 76 and colliminated by lens 79 is directed toward the phototransducer 78.

The timing means 107 further includes a light beam interrupter or timing disc 81 shown more particularly in FIGS. 7 and 8. The interrupter 81 is preferably annular, having an inner marginal portion 82 and an outer marginal portion 83. The interrupter 81 is fixedly mounted on a spacer 84 secured to the outer surface of sleeve 116, and is positioned between a clamp collar 85 surrounding the spacer 84 and an external flange 86 formed on the periphery of the spacer 84. Thus, the timing disc 81 rotates with the sleeve 116 and, hence, with the scanning assembly 100.

The outer marginal portion 83 of the timing disc 81 is provided with a plurality of light transmitting slots or apertures 87 separated from each other by opaque sections 88. The number and spacing of the light transmitting slots 87 are such as to enable the light beam 80 emanating from the lamp 76 to be transmitted to phototransducer 78 by adjacent slots 87 of the rotating disc 81 a multiplicity of times for each sensing by the phototransducer 97 of a contiguous information or data position 31 of information ring 26. This enables the phototransducer 78 to generate a multiplicity of electrical timing signals during the sensing of each data positions 31. Preferably, twenty slots 87 are provided in disc 81 for each data position 31 in information ring 26. In the preferred embodiment wherein the timing disc 81 is driven at the same angular speed as the scanning assembly 100 and, hence, at the same angular speed as the fiber optic illuminating means 190 and phototransducers 97 and 98, the number and spacing of slots 87 are designed to correspond to a multiple, preferably a factor of 20, of the number and spacing of the information bit positions 31 formed in the information ring 26. Specifically, 1,240 equally spaced slots 87 are provided in the outer marginal portion 83 of the disc 81 corresponding to the 20 slots for each of the 62 information bits 31 formed in the information ring 26. With the number and spacing of the slots 87 so selected, each revolution of the timing disc 81 generates 1,240 timing pulses, the pulses being generated as each slot 87 passes between the lamp 76 and the phototransducer 78, permitting the phototransducer to be illuminated by the beam 80.

The number of timing signals generated per data position 31 is arbitrary. However, the accuracy with which the center of a data position can be selected by the logic circuits, to be described, for sampling data, is dependent on the number of timing signals per data position, the accuracy being greater within limits as the number is increased. Accordingly, it is preferable to generate a sufficient number of timing signals, for example, 20, per data position to insure a high degree of accuracy.

Generation of a timing signal by the phototransducer 78 in response to irradiation by the beam 80 when a slot 87 passes between the lamp 76 and transducer may be effected in any desired manner. For example, if the phototransducers are photovoltaic, timing pulses can be generated by monitoring the voltage developed across the output terminals of the phototransducer.

LOGIC CIRCUIT EMBODIMENT I

Structure

The logic circuit 200 illustrated in FIGS. 10A and 10B includes the normally open probe switch 165 connected between a source of positive potential 199 and a driver circuit 198. The switch 165 is adapted to be closed when the probe 12 is positioned in its inner position by movement of a tag 14 to the read position 16 of the reader 10. In the closed position, switch 165 energizes driver circuit 198, which in turn energizes scan motor 103, scan lamp 183, and timing lamp 76.

The circuit 200 also includes a start circuit 201 which is connected to receive input signals from the data line 202, the start line 203 and the ready to receive line 204. The data line 202 and the start line 203 are connected to brushes 71 and 73 of the reader 9 and are responsive to the output signals of the data ring scanning transducer 97 and to the start ring scanning transducer 98, respectively. A positive electrical signal, herein defined as a logical "1," is produced on data line 202 and start line 203 when the data ring scanning transducer 97 and start ring scanning transducer 98, respectively, sense a photosensible data mark and a photosensible start mark, respectively. The ready to receive line 204 is responsive to a utilization device 205, such as a buffer memory for a computer, cash register or the like. A positive electrical signal appears on the ready to receive line 204 when the utilization device 205 is in a "ready" condition, that is, in a condition wherein it is ready to receive information produced as a consequence of a tag reading cycle.

The start circuit 201 includes a ready to receive flip-flop 206 having an input terminal P which is connected to the ready to receive line 204. Flip-flop 206 provides at flip-flop output terminals Q and $\bar{Q}$, which are connected to lines 207 and 208, complementary positive and negative outputs when placed in a set condition upon receipt from the utilization device 205, via a differentiator 196, of the positive ready to receive signal on ready to receive line 204. The ready to receive flip-flop 206 also includes a reset terminal R connected to a reset line 210. The ready to receive flip-flop 206 in response to a negative reset signal on line 210 input to its reset terminal R places the flip-flop in a reset condition, providing at terminals Q and $\bar{Q}$ connected to output lines 207 and 208 negative and positive signals, respectively.

The ready to receive flip-flop 206 is preferably of the type marketed by Texas Instruments, Inc., designated Model SN—7474. A detailed circuit diagram for the ready to receive flip-flop 206 and a truth table describing its operation are shown in FIGS. 25 and 20, respectively, of copending application for "Improved Encoded Tag Reader" in the name of Frederic L. Rieger et al., filed Oct. 3, 1967, Ser. No. 672,629. The entire disclosure of the foregoing Rieger et al. application is incorporated herein by reference.

The start circuit 201 also includes a NAND gate 211. The NAND gate 211 has three input terminals connected to the data line 202, start line 203, and ready to receive line 204, via flip-flop 206, and provides on NAND gate output line 212 a negative signal in response to the simultaneous presence on the input lines 202—204 of positive signals. A start flip-flop 214 is also included in the start circuit 201. The flip-flop 214 is preferably of the type marketed by Texas Instruments, Inc., a designated Model SN—7474. The start flip-flop 214 has an input terminal P connected to the NAND gate output line 212, and an output terminal Q at which a positive signal is provided in response to a negative signal input to terminal P. A reset terminal R, also included, is connected to one of the complementary output terminals of the ready to receive flip-flop 206 via an inverter 215. A negative signal input to terminal R of start flip-flop 214 resets the flip-flop, thereby providing at output terminal Q a negative signal. A negative input to terminal P of start flip-flop 214, which represents the simultaneous occurrence of positive signals on the data, start, and ready to receive lines 202—204, respectively, places the flip-flop 214 in a set condition, providing a positive signal at flip-flop output terminal Q.

The start circuit 201 provides two principal output signals, namely, a negative signal on line 212 and a positive signal on line 216 indicative of the coincidence of positive signals on the data, start, and ready to receive lines 202—204. The positive output signal from the start circuit 201 on line 216 is input directly to a clock signal NAND gate 219. NAND gate 219 is also responsive to positive clock signals on clock line 220 connected to the timing or clock transducer 78. Under normal tag reading conditions, the start flip-flop 214 is in the set condition providing a positive signal on output line 216 from the time the start mark 27 is sensed for the first time by the start ring scanning transducer 98 until the start mark is sensed for a second time following a complete revolution of the start ring scanning transducers. With an enabling signal input to the clock signal NAND gate 219 from start circuit output line 216 for an interval coextensive with a complete scanning revolution beginning and ending with sensing of the start mark 27 by the start ring scanning transducer, clock signals appearing on clock line 220 are gated by NAND gate 219 for one complete revolution of the ticket scanning operation beginning and ending with the sensing of the start mark, thereby providing a train of positive clock pulses on line 221 via an inverter 222. A data mark width NAND gate 223 having its input terminals connected to line 212 via inverter 224 and to line 221, is provided. The NAND gate 223 provides on its output line 225 a train of negative clock signals coextensive in duration to the width of the signal generated as a consequence of sensing the photosensible mark 34 of the data ring which is aligned with the start mark 27.

The logic circuit 200 further includes a data sampling circuit 230 which is operative to sample data signals appearing on data line 202 for storage in a memory unit 232 to be described later. The data sampling circuit 230 includes a flip-flop 233 which is utilized to provide on its output line 229 a pulse train containing one-half the number of pulses contained in the pulse train output from the data mark width gate 223 on line 225. The flip-flop 233 has an input terminal CL connected to line 225 for providing at coupled output terminals Q and K positive signals at a frequency one-half that of the frequency of the positive signals input at terminal CL. The flip-flop 233 also has a reset terminal R connected to a reset line 231 which functions to place the flip-flop in a reset state in response to a negative signal input thereto, providing a negative signal at coupled output terminals Q and K. Flip-flop 233 is preferably of the type marketed by Texas Instruments, Inc., designated Model No. SN—7473. A detailed circuit diagram of such a flip-flop is shown in FIG. 27 and operates in accordance with the truth table of FIG. 22 disclosed in the previously referenced Rieger et al. application.

The data sampling circuit further includes a decade counter 234 having an input terminal CL and four output terminals A, B, C, and D, corresponding respectively to decimal digital values 1, 2, 4 and 8. The decade counter 234 provides positive output signals at terminals A, B, C, and D in a manner such that the algebraic sum of the values associated with each terminal at which positive outputs appear equals the number of positive pulses input to the decade counter at terminal CL. For example, if only a single positive input pulse appears at terminal CL, a positive signal is output at terminal A representing the decimal digital value 1. Similarly, if six positive pulses are input to the decade counter 234 at terminal CL output signals appear at terminals B and C representing the decimal digital value 6. The decade counter 234 has a pair of reset terminals R connected to reset line 236 for placing the decade counter 234 in a condition such that negative signals appear on output terminals A, B, C, and D, representing the digital value 0. The decade counter 234 functions to accumulate, and provide at the output terminals A, B, C, and D, a binary coded representation having a value equal to one-half the number of clock pulses generated during the interval defined by the width of the data mark 34 aligned with the start mark.

The data sampling circuit 230 also includes a decade counter 238 having an input terminal CL output terminals A', B', C', and D', and a pair of reset terminals R. Terminals CL, R, and A', B', C', D' of decade counter 238 function in the same manner as the similarly designated terminals of decade counter 234. Input terminal CL of decade counter 238 is connected to the line 221 on which appear clock signals during the tag reading cycle beginning and ending with the sensing of the start mark 27. The decade counter 238 counts all clock signals starting with the initial sensing of the start mark, providing at output terminals A', B', C', and D' a partial representation of the number of clock signals, the representation being partial in the sense that the decade counter 238 recycles every 10 clock pulses input thereto on line 221.

Decade counters 234 and 238 are identical in construction and preferably are of the type marketed by Texas Instruments, Inc., designated Model SN—7490.

Each of the decade counters 234 and 238 is provided with four inverters 234–1, 234–2, 234–3, 234–4 and 238–1, 238–2, 238–3, and 238–4, respectively. The outputs of these inverters provide complementary signals for the respective output terminals of the decade counter with which they are associated. For example, the signal at the output terminal $\overline{A}'$ of inverter 238–1 is the inverse of the signal at output terminal A' of decade counter 238.

The data sampling circuit 230 also includes a flip-flop 240. The flip-flop 240, like the flip-flop 233, is preferably of the type marketed by Texas Instruments, Inc., designated Model SN—7473. The flip-flop 240 has an input terminal CL and a reset terminal R. Flip-flop 240 also includes terminals Q and K which constitute a first coupled output terminal and terminals J and $\overline{Q}$ which constitute a second coupled output terminal. Coupled output terminals K—Q and $\overline{Q}$—J provide complementary output signals. A negative signal input to terminal R resets the flip-flop 240, providing positive and negative signals at coupled output terminals J-$\overline{Q}$ and Q—K, respectively. The input terminal CL of flip-flop 240 is connected via line 242 to the output of NAND gate 241, NAND gate 241 in turn having its inputs connected to terminals $\overline{A}'$, $\overline{B}'$, $\overline{C}'$, and $\overline{D}'$ of inverters 238–1, 238–2, 238–3 and 238–4, respectively. NAND gate 241 connected in the manner described provides a negative input signal on line 242 to the terminal CL of flip-flop 240 every 10th clock pulse starting with the second clock pulse gated by NAND gate 219, namely, at clock counts 2,12,22,32,42... The flip-flop 240 in response to these negative input pulses, provides negative output signal levels at coupled output terminal $\overline{Q}$-J during clock count intervals 2—12, 22—32, 42—62..., and positive output signal levels during clock count intervals 12—22, 32—42, 52—62... Since the output signal at coupled output terminal K-Q is complementary to the output signal at coupled terminal $\overline{Q}$-J, positive signal levels are provided at coupled output terminal K-Q during clock count intervals 22—32, 42—52, 62—82..., and negative signal levels are provided during clock count intervals 32—42, 52—62, 72—82... The function of the output signals at coupled output terminals K-Q and J-$\overline{Q}$ will become apparent hereafter.

The data sampling circuit 230 further includes eight multi-input NAND gates 251, 252, 253, 254, 255, 256, 257, and 258. Each of the NAND gates 251—258 has four inputs 251-1 to 251–4, 252–1 to 252–4...258–1 to 258–4, respectively, connected to various of the outputs A′, B′, C′, D′ and inverted outputs $\bar{A}'$, $\bar{B}'$, $\bar{C}'$, and $\bar{D}'$ of decade counter 238. The connections are such that all four of the inputs 251–1 to 251–4, 252–1 to 252–4...258–1 to 258–4 of a given NAND gate 251—258, respectively, are simultaneously positive for one particular clock count once every 10 clock pulses, the one particular clock count during which each NAND gate has its four inputs simultaneously positive being different for each NAND gate. The eight different clock counts, which are separated from each other by 10 clock pulses, during which the four inputs 251–1 to 251–4, 252–1 to 252–4...258–1 to 258–4 of NAND gates 251—258, respectively, are simultaneously positive, collectively correspond to the center points of data signals of all possible widths. Specifically, the four inputs 251–1 to 251–4, 252–1 to 252–4...258–1 to 258–4 of NAND gates 251—258 are simultaneously positive at clock counts of 3, 4, 5, 6, 7, 8, 9, and 10, respectively; at clock counts of 13, 14, 15, 16, 17, 18, 19, and 20, respectively; at clock counts of 23, 24, 25, 26, 27, 28, 29, and 30, respectively, corresponding to the center points of successive data signals having widths of 6, 8, 10, 12, 14, 16, 18 and 20, respectively.

The other four inputs 251–5 to 251–8, 252–5 to 252–8 . . . 258–5 to 258–8 are connected in various combinations to the outputs A, B, C, D or inverted outputs $\bar{A}$, $\bar{B}$, $\bar{C}$, $\bar{D}$ of decade counter 234. Since the decade counter 234 is fed clock pulses only during the interval coextensive with the sensing of the start mark, the decade counter 234 does not recycle, but rather remains fixed at one count corresponding to one-half the number of clock pulses generated during the width of the data bit. Thus, for any one data signal width, one and only one set of four of these inputs 251–5 to 251–8, 252–5 to 252–8...258–5 to 258–8 will have all its inputs in a positive condition. Stated differently, for any given data signal width, one and only one of the NAND gates 251—258 is enabled by the outputs A, B, C, D, and inverted outputs $\bar{A}$, $\bar{B}$, $\bar{C}$, $\bar{D}$ of decade counter 234. The particular one of the NAND gates 251—258 which is enabled depends upon the precise width of the data signal. For example, NAND gates 251, 252...258 are enabled for data signals having widths of 6, 8...20 clock counts, respectively. While each of the NAND gates 251—258 has its inputs 251–1 to 251–4, 252–1 to 252–4...258–1 to 258–4 simultaneously rendered positive by decade counter 238 once every 10 clock counts, the clock counts being different for the different NAND gates, because only one of the NAND gates is enabled by the decade counter 234 only one of the NAND gates produces a cyclic output every 10 clock counts. However, the NAND gate 251—258 which does produce an output every 10 clock counts produces an output which, for alternate outputs, occurs at a time coincident with the center point of the data signal.

For example, assuming the width of the data signal is six clock counts wide, NAND gate 251 is partially enabled by the decade counter 234 which has stored therein a count of three corresponding to one-half the width of the six clock count wide data signal. With NAND gate 251 partially enabled by decade counter 234, an output is produced from this NAND gate every 10 clock counts by reason of the cyclic operation of decade counter 238. The exact time of the output from NAND gate 251 is at clock counts of 13, 23, 33, 43... Because decade counter 238 cycles twice for each data position, the frequency of the output of NAND gate 251 is twice that required for data sampling, the signals output therefrom being spaced at 10 clock count intervals instead of 20 clock count intervals corresponding to clock count interval of a data position. However, alternate outputs of NAND gate 251 occurring at clock counts of 23, 43, 63, 83...coincide with the center of the first, second, third, fourth...data positions.

As a further illustration, if the width of the data signal is equal to 16 clock counts, NAND gate 256 is partially enabled by decade counter 234 which has stored therein a count of eight corresponding to one-half the number of clock pulses occurring during the interval defined by the 16 clock count wide data signal. NAND gates 251—255, 257 and 258 are not partially enabled by the decade counter 234. Since only NAND gate 256 is partially enabled by decade counter 234, cyclic outputs at twice the required data sampling frequency are produced only by this NAND gate. These outputs from NAND gate 256 occur each time the four signals from decade counter 238 to inputs 256–5 to 256–8 of NAND gate 256 are all positive, namely, each time a count of eight is accumulated in decade counter 238 which occurs at clock counts of 18, 28, 38, 48... The second output from NAND gate 256 occurring at clock count 28, and alternate outputs thereafter, coincide with the centers of 16 clock count wide data signals should such be present during the first, second, third...data positions. The first output from NAND gate 256 occurring at clock count 18, and alternate outputs thereafter, occur between data signals in the first, second, third...data positions should there be such signals.

Suppression of the surplus first, third, fifth, seventh... negative outputs from the one NAND gate 251—258 which is enabled by decade counter 234 is provided by the flip-flop 240, acting in combination with sample NAND gate 260. Specifically, sample NAND gate 260 is connected via NOR gate 262 to the NAND gates 251—258 and, accordingly, one input to the sample NAND gate 260 is the cyclic negative output of the one NAND gate 251—258 which is partially enabled by the decade counter 234. This cyclic input to sample NAND gate 260 occurs at twice the desired data sampling rate of once per 20 clock pulses. The sample gate 260 also has one input connected to flip-flop 240 which, as will be recalled, switches state every 10 clock counts, namely, at clock counts 2, 12, 22, 32... By reason of the connection of one of the inputs of sample NAND gate 260 to the output of flip-flop 240, the sample NAND gate 260 is partially enabled by the positive output of flip-flop 240 for alternative 10 clock count intervals, namely, is partially enabled for clock count intervals 22—32, 42—52, 62—72... The 10 clock count intervals during which the sample NAND gate 260 is partially enabled by the positive output of flip-flop 240 coincide with the intervals during which data signals occur. When the sample NAND gate 260 is partially enabled by the flip-flop 240 which, as indicated occurs during intervals when data signals occur, alternate ones of the cyclic positive signals output from NOR gate 262 which coincide with the centers of the potential data signals, are effective to gate or sample data input to the sample NAND gate on data line 202, producing sampled data signals on line 261. The positive output from NOR gate 262 occurring between potential data signals cannot function to sample data on line 202 by reason of the NOR gate output being effectively inhibited, suppressed, or blocked by the negative signal input to sample NAND gate 260 provided by flip-flop 240 occurring during intervals when data signals are not potentially present.

The memory unit 232 includes a five-stage or position character storage circuit 265 comprising five storage devices or flip-flops 271—275, each of which is preferably of the type marketed by Texas Instruments, Inc., designated Model SN-7474. Flip-flops 271—275 each have two terminals P and $\bar{Q}$ which are connected to each other, and an input terminal R connected to a reset line 276. When a negative signal appears on reset line 276, which occurs after each character is read by the data scanning transducer, those storage devices 271—275 in the set condition corresponding to the storage of a logical "1" are switched to the reset condition, providing negative signals at their output terminals Q and on their respective output lines 281—285. The storage devices 271—275 further include sample data input terminals CL each connected to the sample data line 261 constituting the output of the sample NAND gate 260. When a negative signal on sample data line 261 is present which occurs when a photosensible mark in the information ring is sensed by information ring scanning transducer 97, and when the storage device is primed by a positive signal input to a priming terminal D, the storage device is switched from the reset state corresponding to a logical "0" to the set state corresponding to a logical "1," producing a positive signal at the output terminal Q. A positive priming signal at terminal D of flip-flops 271—275 is necessary to permit the flip-flops to switch from the reset state in response to a negative sample data input at terminal CL.

The memory unit 232 further includes five NAND gates 291—295 each having a first input terminal connected in common to a reset line 231, and a second input terminal connected respectively to the storage device output lines 281—285. When primed storage devices 271—275 are switched from the reset state by the presence of negative signals at their input terminals CL provided by the sampled data line 261, the positive outputs produced at terminals Q and present on output lines 281—285 are gated through their associated normally enabled NAND gates 291—295 producing negative signals on the NAND gate output lines 296—300. The negative signals in turn are input to inverters 301—305, producing positive outputs which constitute the output from the memory unit 232 to the utilization device 205.

A five-position ring counter generally indicated by the reference numeral 310 is included in the memory circuit 232. The ring counter 310 includes five flip-flops 315, 316, 317, 318 and 319 which are sequentially stepped by stepping pulses from a stepping circuit 320 to be described to successively enable different ones of the storage devices 271—275 in synchronism with the successive sensing of positions A—E of the character groups 37—48. The flip-flops 315—319 preferably are of the type marketed by Texas Instruments, Inc. designated Model SN-7473.

Flip-flops 315—319 each have an output terminal Q connected via lines 321, 322, 323, 324, and 325, respectively, to the priming terminal D of the flip-flops 271—275, respectively, and a $\bar{Q}$ terminal connected via lines 326, 327, 328, 329 and 330, respectively, to the K or priming terminal of flip-flops 316, 317, 318, 319, and 315, respectively. The connection of the Q terminal and $\bar{Q}$ terminal of the ring counter flip-flops 316—319 to priming terminals J and K of successive flip-flop stages thereof facilitates priming or enabling of successive ring counter flip-flops when the preceding flip-flops are in the set condition, providing negative and positive outputs at their Q and $\bar{Q}$ terminals. The connection of the Q terminal of ring counter flip-flops 315—319 to the D terminal of memory flip-flops 271—275 facilitates successive priming or enabling of the memory flip-flops when the ring counter flip-flops are successively in the set condition, providing positive signals at their Q terminal. The ring counter flip-flops 315—319 each have an input terminal CL connected via a line 338 to the counter stepping circuit 320. A negative signal from the counter stepping circuit 320 input to the terminal CL of a flip-flop 315—319, assuming it is primed by positive and negative signals at its terminals J and K, sets the flip-flop, producing positive and negative signals at output terminals Q and $\bar{Q}$. In addition, each of the flip-flops 315—319 has a reset terminal R which is connected to the reset line 231. A negative signal at terminal R resets the ring counter flip-flops 315—319 producing negative and positive output signals at terminals Q and $\bar{Q}$.

The ring counter 310 further includes a flip-flop 333 having an input terminal R connected to reset line 231, an input terminal P connected to the $\bar{Q}$ terminal of flip-flop 315, and an output terminal Q connected via an inverter 331 to the J terminal of flip-flop 315. The flip-flop 333 is preferably of the type marketed by Texas Instruments, Inc., designated Model SN-7474, and functions in combination with the inverter 331 to prime the first ring counter stage flip-flop 315 when the flip-flop 333 is reset at the end of a complete tag reading cycle thereby enabling flip-flop 315 to be placed in its set condition in response to the first stepping signal from the stepping circuit 320 occurring immediately prior to the scanning of the first data position A of the first character group by the data ring transducer 97.

The stepping circuit 320 includes a NAND gate 335 having four inputs connected to the output or inverted output terminals of the decade counter 238 in a manner such that an output is produced from NAND gate 335 once every 10 clock counts, preferably at clock counts 8, 18, 28, 38, 48... The output of the NAND gate 335 is input to a NAND gate 336 via an inverter 337. The NAND gate 336 has as its other input the coupled J-$\bar{Q}$ output of flip-flop 240 which, as indicated previously, is negative during the clock count intervals 2—12, 22—32, 42—52...and positive during the clock count intervals 12—22, 32—42, 52—62... The combination of the input to NAND gate 336 from inverter 337 occurring once every 10 clock counts and the input to NAND gate 336 from flip-flop 240 which is alternately switched from positive to negative every 10 clock counts effectively causes alternate outputs from inverter 337 to be inhibited or suppressed, providing on NAND gate output line 338 a negative signal prior to the occurrence of the scanning by the data ring transducer of every data position of the tag. These signals present on NAND gate output line 338 occurring at 20 clock count intervals function to step the ring counter 310 once per data position at a point in time slightly prior to the alignment of the data ring scanning transducer 97 with the data position of the information or data ring.

A character readout circuit 340 is provided to reset the memory flip-flops 271—275 after each character has been scanned to facilitate parallel readout of the information stored during that character scan. The character readout circuit 340 includes a NAND gate 341 having four inputs connected to the outputs or inverted outputs of the decade counter 238 in a manner such that pulses are output from NAND gate 341 every other of which occurs at a time shortly following the storage in memory flip-flop 275 of the last data position of the character being scanned. Preferably the NAND gate 341 is connected to provide output signals at clock counts of 3, 13, 23, 33..., the useful clock counts being 113, 213, 313, 413... The output of NAND gate 341 is input to a NAND gate 342 via an inverter 343. The other input to the NAND gate 342 is derived from the flip-flop 240. To suppress the undesired output pulses of NAND gate 341 the NAND gate 342 is provided. The input of NAND gate 342 is connected to the flip-flop 240 in a manner such that the outputs from inverter 343 occurring at counts 3, 23, 43, 63...are suppressed, the NAND gate outputs occurring at times 13, 33, 53, 73...being gated via inverter 344 to a NAND gate 345. The NAND gate 345 has as its other input the output provided at the Q terminal of ring counter flip-flop 319, which output functions to suppress all signals input to NAND gate 345 from inverter 344 except those occurring shortly after sensing the last data position E of each character, namely, to suppress all pulses except those occurring at times 113, 213, 313, 413... Ring counter flip-flop 319 is switched to the set condition by pulses from the stepping circuit 320 on line 338 on clock counts of 98, 198, 298, 398...and is switched to the reset condition on counts of 118, 218, 318, 418... NAND gate 345 therefore provides an output at counts of 113, 213, 313, 413... This output is input to NOR gate 346 which in turn is connected to an inverter 347 to provide a reset signal to the memory flip-flops 271—275 at counts of 113, 213, 313, 413..., producing a parallel readout of the information stored in these flip-flops shortly following scanning of data position E by the data ring transducer 97, in the manner described previously.

A parity error detector circuit 350 is provided and includes a flip-flop 351. The flip-flop 351 preferably is of the type marketed by Texas Instruments, Inc., designated Model SN-7473. Flip-flop 351 has a reset terminal R connected to the reset line 231, an input terminal CL connected to the sample data line 261, and coupled K—Q terminals connected to one input terminal of a NAND gate 352. The other input terminal is connected to the NOR gate 346. At the start of a tag reading cycle, flip-flop 351 is in the reset condition providing negative signals at coupled output terminal K—Q. The first logical "1" data signal of the first character input to terminal CL of the flip-flop 351 switches the flip-flop, providing a positive signal at coupled output terminal Q—K. If another logical "1" does not occur during the scanning of A through E of the first character group, the coupled Q-K output of flip-flop 351 remains positive. This positive output produces an output from NAND gate 352 when a positive signal is output from NOR gate 346 following completion of scanning of the first character group. The output from NAND gate 352 signals a parity error, providing a signal to NOR gate 355 which produces a system reset signal on line 236.

If during the scan of the first character A a second logical "1" is sensed, a second negative data signal corresponding to the second logical "1" is input to terminal CL of flip-flop 351, returning the flip-flop to its reset state. In the reset state, a negative signal is input to the NAND gate 352 preventing the NAND gate from providing a parity error output signal when the NAND gate is pulsed by the output from NOR gate 346 provided at the end of the character scan. Similarly, if during a character scan an odd number or logical "1's" is sensed and input to the flip-flop 351, upon completion of the character scan when the NAND gate 352 is pulsed by the output of NOR gate 346 a parity error signal is input to the NOR gate 355 to produce a system reset signal on line 236.

A character counter 360 is provided, and includes a duo-decade counter 361. The counter 361 is preferably of the type marketed by Texas Instruments, Inc., designated Model SN-7492. Counter 361 has a pair of reset terminals R which when provided with a positive reset signal on line 236 resets the counter to a count of zero. Counter 361 also has an input terminal CL responsive to the positive output of a NOR gate 362 which occurs once per character as the characters are read out of the memory flip-flops 271—275 in parallel. A NAND gate 363 responsive to the outputs of the duo-decade counter 361 via inverters 364, 365, 366 and 367 provides a negative output to an inverter 368 in response to the entry into the duo-decade counter of 12 positive pulses.

The positive output from inverter 368 which is produced as a consequence of the successive readout of 12 characters from the memory flip-flops 271—275 is input to a NAND gate 370 of a reset circuit 371. NAND gate 370 has as its other two inputs the inverter output of NAND gate 211 via inverter 224 and the priming output at terminal Q of the fourth ring counter position flip-flop 318. A negative output is produced from NAND gate 370 indicating that the tag has been properly read when three conditions simultaneously occur, namely, when the character counter 360 provides a positive output indicative of the reading out of 12 characters from the character storage circuit 265, when a positive signal from NAND gate 211 is provided indicating that the start mark 27 has been sensed a second time by the start ring scanning transducer 98, and when a positive priming signal from the fourth ring counter flip-flop 318 is provided indicating that the 64th data position on the information ring of the tag is aligned with the information ring scanning transducer 67.

The reset circuit 371 also includes the NOR gate 355. NOR gate 355 is responsive to the output from NAND gate 352 of the parity error detector 350, the output of the plunger or aligner switch 165 provided on line 373, and the output from a message complete NAND gate 370 indicating completion of a proper tag reading cycle. NOR gate 355, in response to completion of a proper reading cycle, a parity error, or movement of the plunger or aligner 12 from the retracted position, produces a positive output on line 236 and an inverted or negative output on line 210 via inverter 374. The positive and negative signals on lines 236 and 210 collectively constitute system reset signals.

The reset signal on line 210 functions to reset the ready-to-receive flip-flop 206. Resetting of flip-flop 206 disables NAND gate 211, which in turn disables NAND gates 370 and 223 via inverter 224. Resetting of flip-flop 206 also resets start flip-flop 214 via inverter 215, which in turn disables NAND gate 219. Resetting of flip-flop 206 further operates to reset flip-flops 351, 233, 315—319, 240, 333, and 271—275 via NOR gate 346, inverter 215, and inverter 347, as well as to disable NAND gates 291—295. The reset signal on line 236 resets counter 361, counter 234, and counter 238.

A complete read indicating circuit 380 is provided to illuminate the complete read indicator lamp 17 mounted in the reader upon completion of a tag reading operation. The complete read circuit 380 includes a flip-flop 381. The flip-flop 381 is preferably of the type marketed by Texas Instruments, Inc., designated Model SN-7474. The flip-flop 381 has an input terminal P responsive to the output from the message complete NAND gate 370 indicating that a message has been properly read, and a reset terminal R responsive to the probe or aligner switch signal line 373. The flip-flop 381 further includes an output terminal Q connected to the message complete indicating lamp 17 for providing a positive signal for illuminating the lamp upon completion of a proper reading of the tag. The signal provided at terminal Q is rendered negative to extinguish the lamp in response to a negative signal input to reset terminal R as a consequence of a removal of the ticket from the read station and the consequent extension of the probe or aligner, following completion of a proper reading cycle.

OPERATION

When the tag 14 is brought to the read position or station 16, and the probe 12 inserted into the reader housing 10, switch 165 is closed. Closing of switch 165 energizes driver circuit 199, in turn energizing scan motor 103, scan lamp 183 and timing lamp 76. Closing of switch 165 also causes a positive signal to be input to NOR gate 355, which in turn provides a negative signal on line 236 and a positive signal via inverter 374 on line 210. These signals remove the system reset signals previously existing on lines 210 and 236, permitting the various system counters and flip-flops to be placed in a set condition. Specifically, when the system reset signal is removed from line 210 a positive signal is input to the ready to receive flip-flop 206, enabling this flip-flop to switch when the ready to receive signal is present on line 204. The negative signal from NOR gate 355 on line 236 is input to counter 361, counter 234, and counter 238 lifting the reset to these counters. When the positive ready to receive signal arrives on line 204 the ready to receive flip-flop 206, which has been enabled by reason of its reset being lifted, is switched, providing a positive signal at its Q terminal and a negative signal at its $\bar{Q}$ terminal. The negative signal at the ready to receive flip-flop $\bar{Q}$ terminal is inverted and fed on line 217 to the start flip-flop 214, lifting the reset to the start flip-flop. The inverted ready to receive flip-flop signal on line 217 is also fed to the counter 233, the parity flip-flop 351, and the flip-flops 240, 315—319, and 333 via line 231, lifting the reset for these devices. Additionally, the inverted ready-to-receive flip-flop output on line 217 is fed via line 231 to the NAND gates 291—295, disabling these gates. The inverted ready to receive flip-flop output on line 217 is also fed via a NOR gate 346 and an inverter 347 to the memory flip-flops 271—275, relieving the reset lines of each of these flip-flops.

When the start mark 27 is sensed by the start ring scanning transducer 98, a positive start signal (FIG. 11b) is received on line 203 and input to NAND gate 211 which is enabled by the positive output of the ready to receive flip-flop on line 207. When the data mark 34 is sensed by the data mark scanning transducer 97, which occurs substantially concurrently with the sensing of the start mark 27, a positive data signal (FIG. 11c) is received on line 202 and input to NAND gate 211, providing a negative signal (FIG. 11d) on line 212 to the input terminal P of the start flip-flop 214. This negative input at terminal P switches the start flip-flop 214, providing on flip-flop output line 216 a positive signal level to NAND gate 219, enabling this NAND gate. Since the start flip-flop 214 is only reset in response to a parity error, premature probe withdrawal, or a completed tag reading cycle, the NAND gate 219, once enabled, ordinarily remains enabled until the tag is completely read, gating all clock signals input thereto beginning with sensing the start mark 27 and continuing until the tag is completely read.

The output of NAND gate 211 (FIG. 11d) is also fed via inverter 224 to NAND gate 223 to enable this NAND gate for the duration of the start signal on line 203. With NAND gate 223 enabled for the duration of the start signal, clock signals (FIG. 11a) input on line 220 are gated (FIG. 11e) to the counter 233 which provides on its output line 229 pulses with a repetition rate equal to one-half the clock pulse rate. The pulses provided by the counter 233 are input to a decade counter 234 which accumulates therein a count equal to one-half the number of pulses occurring during the duration of the start signal present on line 203. The various output terminals A, B, C, D of the decade counter 234 are input in various combinations to terminals 251—1 to 251—4, 252—1 to 252—4, ...258—1 to 258—4 of the NAND gates 251—258 of data sampling circuit 230. For any given start and data signal width, one and one only of the NAND gates 251—258 is enabled by reason of the output of the decade counter 234. In the illustrative example herein, it is assumed that the data and start signal outputs from the data and start transducers 97, 98 as a consequence of the sensing of data and start marks 34 and 27 are six clock pulses wide. Accordingly, NAND gate 251 has its four inputs 251—1 to 251—4 maintained in a positive condition by reason of their being connected to outputs A, B, $\bar{C}$, $\bar{D}$ of decade counter 234, which are all positive by reason of the storage therein of a count of three corresponding to one-half the assumed width of the data and start signals.

While the counters 233 and 234 are operating to store a count equal to one-half the clock pulses occurring during the start and data signal interval, the clock pulses (FIG. 11a) on line 220 are being gated (FIG. 11f) via NAND gate 219 and an inverter 222 to the clock pulse decade counter 238. The clock pulse decade counter 238 accumulates a count of 10 clock pulses prior to recycling. The output of the clock pulse decade counter 238 is input in various combinations to the NAND gates 251—258. Because of the constant recycling of the clock pulse decade counter 238, each of the NAND gates 251—258 has its inputs 251—5 to 251—8, 252—5 to 252—8,...258—5 to 258—8 simultaneously positive once every 10 clock pulses. In the example given herein where the data and start signals are six clock pulses wide, the NAND gate 251 has its terminals 251—1 to 251—4 maintained continuously positive by decade counter 234. Since the same NAND gate has its terminals 251—5 to 251—8 connected to the clock pulse decade counter 238 in a manner such that these terminals are periodically positive each time a count of three is accumulated in decade counter 238, the output (FIG. 11h) of the NAND gate 251 is cyclically positive on clock counts of 13, 23, 33, 43, 53,... These outputs are provided from NAND gate 251 at a repetition rate twice that required for sampling data. To utilize only alternate ones of these outputs, the output (FIG. 11i) of flip-flop 240 is gated, along with the output (FIG. 11h) of NAND gate 251 and the data signals (FIG. 11c) on line 202, by sample NAND gate 260, providing on line 261 sample data signals (FIG. 14j).

At clock counts of 18, 38, 58,... outputs (FIG. 11g) are provided from NAND gate 336 of the ring counter stepping circuit 320 to terminals CL of the ring counter flip-flops 315—319. The first ring counter flip-flop 315, which is primed by flip-flop 333, is stepped or set at the 18th clock count by the output from the ring counter stepping circuit 320 on line 338. When the first ring counter flip-flop 315 is switched to its set condition at the 18th clock count, the first memory stage flip-flop 271 is enabled via line 321.

Upon the occurrence of the 24th clock pulse, positive signals are provided to the sample NAND gate 260 by the NAND gate 251 and the flip-flop 240, enabling the sample NAND gate, permitting it to gate to line 261 data signals present on line 202. In the illustrative example given, reference being made to the character group 37 of FIG. 9 only, no data mark (FIG. 11c) is in data position A of the first character 37. Accordingly, no output is provided by sample NAND gate 260, that is, no negative pulse is provided on line 261, to the first memory flip-flop 271. Hence, memory flip-flop 271 stores a logical "0."

As tag scanning continues, the 39th clock pulse causes the ring counter stepping circuit 320 to again provide a stepping signal (FIG. 11g) on line 338 to all of the ring counter flip-flops 315—319. Since only the second ring counter flip-flop 316 is enabled, the stepping signal occurring at the 38th clock count from the ring counter stepping circuit 320 is effective to set only the second ring counter flip-flop 316. With the second ring counter flip-flop 316 set, an enable signal is provided to the second memory flip-flop 272 via line 322. At clock count 43, sample data NAND gate 260 is again enabled by the coincidence of outputs from NAND gate 251 (FIG. 11j) and flip-flop 214 (FIG. 11i). Since in the example under consideration, it is assumed a logical "1" is stored in the second data position B of the first character, a positive data signal (FIG. 11c) on the data line 202 is fed to the sample gate 260, providing a negative sample data signal (FIG. 11k) on line 261 to the memory flip-flops 271—275. Thus, the combination of a logical "1" on the data line 202, an output from NAND gate 251 at clock count 44, and an output from the flip-flop 214 causes the data signal to be gated by NAND gate 260 to the memory flip-flops 271—275. Since only the second memory flip-flop 272 is enabled by the ring counter 310, the signal gated by NAND gate 260 switches only this flip-flop, storing a logical "1" therein. With a logical "1" stored in flip-flop 272, a positive signal level is output from this flip-flop on line 282 to a NAND gate 292 which is enabled. NAND gate 292 provides a negative signal on its output line 297.

At clock count 58, the ring counter 310 is stepped by the output (FIG. 11g) on line 338 from the ring counter stepping circuit 320, setting the third flip-flop 317 of this counter, the only ring counter flip-flop which is primed. With the third stage 317 of the ring counter 310 set, the third memory flip-flop 273 is enabled via line 323. At count 63 positive signals from NAND gate 251 (FIG. 11h) and flip-flop 214 (FIG. 11i) are again concurrently input to NAND gate 260. Since no data mark (FIG. 11c) is present in the third data position C of the first character 37, no positive output data signal is provided on the data line 202 (FIG. 11k) to the NAND gate 260, causing no negative sample data signal to be input to the memory flip-flops 271—275. Consequently, a logical "0" is stored in the enabled third flip-flop 273 of the memory.

Upon reaching a clock count of 78, a stepping signal (FIG. 11g) is provided to the ring counter 310 by the stepping circuit 320 which steps the ring counter and sets the fourth ring counter flip-flop 318, this flip-flop being the only one enabled at this time. When the fourth ring counter flip-flop 318 is set, an input is provided to the fourth memory stage flip-flop 274 via line 324 enabling this memory stage flip-flop. At clock count 83, positive signals are again concurrently input to NAND gate 260 from NAND gate 251 (FIG. 11h) and flip-flop 214 (FIG. 11i), enabling NAND gate 260. No data mark (FIG. 11c) is present in the fourth data position D of the first character, and consequently, a logical "0" or negative signal is present on data line 202 and input to the NAND gate 260, causing a positive output to be input to the memory flip-flops 271—275 from NAND gate 260. This positive output causes a logical "0" to be stored in the memory flip-flop 274.

Upon occurrence of the 98th clock count, an output (FIG. 11g) is provided from the ring counter stepping circuit 320 which steps the ring counter setting the fifth position flip-flop 319, the only one primed. Setting of the fifth position flip-flop 319 of the ring counter 310 in turn enables the fifth memory flip-flop 275 via line 325. At clock count 103, positive signals are again input to the NAND gate 260 from NAND gate 251 and flip-flop 214, enabling NAND gate 260. Since a logical "1" is present in the fifth data position E of the first character, a positive signal (FIG. 11c) is input on line 202 to NAND gate 260, producing a negative signal (FIG. 11k) on line 261. This negative signal switches the fifth stage memory flip-flop 275, the only one enabled by the ring counter 310, storing a logical "1" therein. With a logical "1" stored in memory flip-flop 275, a positive signal is provided on the output line 285 of the flip-flop, in turn producing a negative signal on NAND gate output line 300.

Upon reaching a clock count of 113, the character read out circuit 340 provides an output (FIG. 11I) to memory flip-flop reset terminals R, resetting those memory flip-flops 271—275 which are in the set condition by reason of having a logical "1" stored therein. When the memory flip-flops 271—275 are reset, the outputs of those memory flip-flops having a logical "1" stored therein change from positive to negative, in turn causing the outputs of their associated NAND gates 291—295 to change from negative to positive. In the example herein, logical "1"s are stored in flip-flops 272 and 275. Accordingly, only the flip-flops 272 and 275 are reset by the output from the character read out circuit 340 on line 276, and only NAND gates 292 and 295 have negative-to-positive signal changes on their output lines 297 and 300. These latter signal changes, when fed through inverters 302 and 305, constitute the output of the memory 232 to the utilization device 205. The change in signal level from negative to positive occurring on NAND gate output line 297 occurring when the storage circuit 265 is read out, in addition to being fed via inverter 302 to the utilization device 205, is also input to the character counter 361, advancing this counter one count to reflect the fact that one character has been read from the tag.

The output of the character read out circuit 340 is also fed to the parity circuit 350 to sample the output of the parity error flip-flop 351 to determine if a parity error has occurred. If no error has occurred, the output of the NAND gate 352 is positive. If a parity error has resulted, a negative output is provided by NAND gate 352 which is input to NOR gate 355, providing a system reset signal on lines 236 and 210.

The ring counter 310 is ready to recycle to successively enable the memory flip-flops 271—275 in response to successive stepping signals on line 338 by reason of the $\bar{Q}$ output terminal of the fifth ring counter flip-flop 319 being fed back to the first position ring counter flip-flop 315, priming the first position ring counter flip-flop.

The foregoing sequence of operations for reading the first character is repeated 12 times until all 12 characters have been read, stored, and input to the utilization device 205. When 12 characters of the tag have been read, stored, and input to the utilization device, a count of 12 has been accumulated by the character counter 361, producing an output from the character counter circuit 360. This output in combination with the second start signal on line 203 and the enable signal of the fourth position ring counter flip-flop 318 on line 324 causes NAND gate 370 to provide a message complete signal. The message complete signal is input to the indicator lamp flip-flop 381, setting this flip-flop and causing the indicator lamp 17 to become illuminated. The message complete signal is also input to NOR gate 355, producing system reset signals on lines 236 and 210, resetting the entire circuit 200. When the probe 12 is extended by reason of removal of the tag 14 from the read position 16, switch 165 opens, deenergizing driver circuit 199, and in turn scan motor 103, scan lamp 183, and timing lamp 76. Additionally, a negative signal is input to lamp flip-flop 381, resetting this flip-flop and extinguishing the indicating lamp 17.

LOGIC CIRCUIT EMBODIMENT II

Structure

The logic circuit 400 illustrated in FIGS. 13A and 13B includes the probe switch 165 connected between ground and a probe flip-flop 401, which functions to provide a relatively negative input to the probe flip-flop 401 when the plunger 12 is inserted into reader housing 10. The probe flip-flop 401 is responsive to the state of the plunger switch 165 for controlling the energization of the scanning motor 103, tag illumination lamp 17, and timing lamp 76, and a ready to transmit flip-flop 402, to be described. The probe flip-flop 401, more specifically, includes a NAND gate 403 having an input connected to a plunger or probe line 404 via an inverter 405, an input connected to an end of message line 406, an input connected to a parity error line 407, and an input connected from the output of a NAND gate 408. The NAND gate 408 is responsive to the output of NAND gate 403 via line 411 and, via a differentiator 410, is responsive to the plunger line 404.

Under nonread or normal conditions, the probe flip-flop 401 is in the reset condition providing a negative output from the NAND gate 408, the probe flip-flop having been placed in this condition by a negative end of message signal input thereto on line 406, or alternatively by negative signals input thereto on lines 407 and 409 indicating, respectively, a parity error or a return of the probe to its normal extended position. When a tag is engaged with the probe and positioned at the read station urging the probe into its retracted position in the reader housing, the positive signal on probe line 404 becomes negative, providing on line 409 a positive signal to the NAND gate 403. The occurrence of the positive signal on line 409, along with the positive signals normally present on the end of message line 406 and the parity error line 407, causes the NAND gate 403 to produce a negative output on its output line 411 when the output of NAND gate 408 becomes positive which occurs when the differentiated probe signal output from differentiator 410 negatively pulses NAND gate 408. The negative output from NAND gate 403 produces a positive output on line 412 from NAND gate 408 which is coupled back to the input of the NAND gate 403 latching the probe flip-flop 401 in its set state or condition.

The positive output on line 412, which occurs when the probe flip-flop 401 is placed in its set condition by positioning a tag at the read station, is input to a driver circuit 399, energizing this circuit which, in turn, energizes the scan motor 103, the illumination lamp 17, and the timing lamp 76.

The positive output on line 412 produced in response to positioning of a tag at the read station is also input to the ready to transmit flip-flop 402. The ready to transmit flip-flop 402 includes a NAND gate 416 having one input responsive to line 412 and another input responsive to the output of NAND gate 417. NAND gate 417 has as its other input the output of an inverter 418, inverter 418 in turn having as its input the output of a delay network 419 connected to respond to the output of the probe flip-flop on line 412. In the normal or nonread condition, the ready to transmit flip-flop 402 is in a reset condition by reason of a negative input signal on line 412 from the probe flip-flop 401, producing a negative output signal on line 420. In response to a positive signal on probe flip-flop output line 412, the ready to transmit flip-flop 402 is switched to a set state, providing a positive signal on line 420. The positive signal on line 420 is connected to a utilization device 421, such as a buffer memory, cash register or the like.

The logic circuit 400 further includes a start circuit 423 including as its principal element a NAND gate 424 having its inputs connected to the data line 425 via an inverter 426, the ready to receive line 427, and the start line 428 via an inverter 429. The start circuit 423 provides an output line 430 from the NAND gate 424 a negative signal in response to the simultaneous presence of a logical "1" data signal on data line 425 manifested as a negative pulse, a positive signal on ready to receive line 427 from the utilization device 421 indicating that the utilization device is in a ready condition to receive information read from the tag, and a start signal on start line 428 manifested as a negative pulse. The negative signals on lines 428 and 425 occur simultaneously once per revolution or scan of the ticket when the start and data ring scanning transducers 98 and 97 aligned with the start and data rings are in sensing relationship to the start mark 27 and the data mark 34 aligned therewith.

The negative signal output from the start circuit 423 on line 430 indicating the coincident receipt of a positive signal on the ready to receive line 427 and negative signals on the data and start lines 425 and 428, is input to a reset flip-flop 432, specifically is input to a NAND gate 433. The reset flip-flop 432, in addition to the NAND gate 433, also includes a NAND gate 434, the output of which on line 435 is connected to the other input of NAND gate 433. The NAND gate 434 has one of its inputs connected to the output of NAND gate 433 and its other input connected to the output of the probe flip-flop 401 appearing on line 412.

The reset flip-flop 432 in the normal nonread condition, is in the reset state having been placed in this condition by the negative output from the probe flip-flop 401 appearing on line 412 which occurs when the probe flip-flop is reset by either a negative end of message signal on line 406, a negative parity error signal on line 407, or a negative probe signal on line 409 representing the return of the probe to its normal extended position. With the reset flip-flop 432 in the reset condition, a negative signal is produced on output line 436. The reset signal on line 436 resets an excess sample signal suppression flip-flop 437, a parity flip-flop 438, and shift register flip-flops 441—446 via a register reset circuit 447 to be described later. With the reset flip-flop 432 in the reset condition, a positive signal is provided on line 435 which functions to reset a decade counter 448 and a duo-decade counter 449 to be described.

The reset flip-flop 432 is placed in the set condition by a positive signal input to NAND gate 434 from the probe flip-flop output line 412 when the probe flip-flop 401 is switched to its set condition in response to movement of the plunger 12 to the inner position for tag reading. In the set condition of the reset flip-flop 432, a positive signal is provided on line 436 lifting the reset to the various circuits previously described which are reset by the negative signal on line 436, and a negative signal is provided on line 435 lifting the reset to the decade and duo-decade counters 448 and 449.

A negative output on line 430 from the start circuit 423, in addition to placing the reset circuit 432 in the set condition, is also input to a NAND gate 450 of a sample signal generator circuit 398. This input to NAND gate 450 on line 430, in combination with the normally positive signal output from terminal $\overline{Q}$ of a clock pulse suppression flip-flop 451, is effective to produce on NAND gate output line 452 a positive signal. The positive signal on output line 452 of the NAND gate 450 is input to the reset terminal R of the clock pulse suppression flip-flop 451, lifting the reset from this flip-flop and enabling the flip-flop to switch in response to positive clock pulses input to its input terminal CL on clock line 455. The clock pulse suppression flip-flop 451 is preferably of the type marketed by Texas Instruments, Inc., designated Model SN-7473, and is operative to produce an output terminal $\overline{Q}$, when the flip-flop reset is lifted by the presence of a positive signal at reset terminal R, a train of negative pulses having a frequency one-half that of the frequency of the positive clock pulses input to terminal CL from clock line 455. The output terminal $\overline{Q}$ of the clock pulse suppression flip-flop 451 is normally held at a positive signal level by the negative signal output from NAND gate 450 on line 452 which exists in the absence of an output from the start circuit 423 on line 430 produced by the simultaneous presence of signals on data and start lines 425 and 428 and on the ready to receive line 427.

The sample pulse generator circuit 398 also includes a clock NAND gate 454 which is responsive to the output of the reset circuit 432 on line 436, the clock line 455, and the output on line 456 of the clock pulse suppression flip-flop 451. The clock gate 454 produces a train of negative clock pulses on output line 457. The exact frequency of the pulse train produced on line 457 depends upon whether or not the clock pulse suppression flip-flop 451 is providing on its output line 456 a train of clock pulses. During the interval that the start mark 27 and the data mark 34 aligned therewith are simultaneously being sensed, the clock pulse suppression flip-flop 451 has its reset lifted, enabling this flip-flop to provide to clock gate 454 on output line 456 a train of negative clock pulses at a repetition rate one-half that of the positive clock pulses present on line 455.

With a train of negative clock pulses input to the clock gate 455 on line 456 having a repetition rate one-half that of the repetition rate of the positive clock pulses input to the clock gate on line 455, the clock gate 454 is disabled coincidentally with every other positive clock pulse input on line 455. Disablement of the clock gate 454 in this manner during the coincidence of the start mark and the data mark aligned therewith is effective to produce on output line 457 a train of pulses having a repetition rate one-half that of the train of pulses occurring during the interval that the data mark 34 aligned with the start mark is being sensed.

Upon completion of the sensing of the data mark 34 aligned with the start mark 27, the clock pulse suppression flip-flop 451 is placed in its reset condition by the start circuit 423 operating through the NAND gate 450, preventing the switching of this flip-flop which in turn prevents the negative disabling signals on output line 456 from being generated in response to the positive clock signals input to terminal CL. With the signal on line 456 of the clock pulse suppression flip-flop 451 returned to its positive level following completion of the sensing of the data mark 34 aligned with the start mark 27, the clock gate 454 is continuously enabled and the positive clock pulses appearing on clock line 455 are gated through NAND gate 454 producing on output line 457 a train of negative clock pulses having a repetition rate equal to the repetition rate of the clock pulses on line 455.

At this point it will become apparent, assuming there are 20 clock pulses per data position, that the 20th clock pulse output from the clock gate 454 coincides with the center of the first data position A of the first character. The coincidence in time of the 20th pulse output from clock gate 454 and the center of the first data position A of the first character obtains regardless of the width of the data signal as exemplified by the width of the data mark 34 aligned with the start mark. For example, if the data mark width as exemplified by the width of the data mark aligned with the start mark is 10 clock pulse wide, the 20th pulse output from the clock gate 454 coincides with the 25th clock pulse input on line 455 to the clock gate; the 25th pulse on line 455 coinciding with the center of a 10 clock count wide data mark in the first data position A of the first character. Similarly, if the width of the data marks as exemplified by the width of the data mark aligned with the start mark is 16 clock pulses wide, the 20th clock pulse output from the clock gate 454 on line 457 coincides with the 28th clock pulse on line 455, the 28th clock pulse on line 455 occurring at the center of a 16 clock pulse wide data mark appearing in the first data position A of the first character.

To cyclically accumulate a count of 20 clock pulses output from the clock gate 454 and cyclically produce a sample signal for sampling the data signals at the center of the signal, a decade counter 448 and an excess sample signal suppression flip-flop 437 are utilized. The flip-flop 437 and counter 448 are preferably of the type marketed by Texas Instruments, Inc., designated Models SN-7473 and SN-7490. The decade counter 448 has an input terminal CL responsive to the clock gate output line 457 via an inverter 460, and reset terminals R connected to the reset line 435 of the reset flip-flop 432. The decade counter 448 also has four outputs A, B, C, and D having digital values 1, 2, 4, 8, respectively. Connected to terminals A and D having digital values 1 and 8, respectively, is a NAND gate 461. NAND gate 461 senses the simultaneous occurrence of positive signals on decade output terminals A and D, corresponding to the digital values 1 and 8, respectively, and provides on NAND gate output line 462 a negative pulse once every 10 clock pulses output from the clock gate 457. The second pulse on output line 462 and alternate pulses thereafter coincide with the 20th, 40th, 60th,...clock pulses output from the clock gate 454 and accordingly coincide with the centers of the data marks regardless of their widths. The first output pulse on line 462 and alternate pulses thereafter occur coincidentally with the 10th, 30th 50th...clock pulses output from clock gate 454 and hence fall between the data signals and are not useful in the data sampling operation. Accordingly, the first output on line 462 and alternate outputs thereafter must be suppressed.

Suppression of the undesirable outputs occurring at counts of 10, 30, 50...output from the clock gate 454 are suppressed by the excess sample signal suppression flip-flop 437. The flip-flop 437 has its input CL connected via an inverter 463 to the output line 462 of the NAND gate 461, and produces at its output terminal $\bar{Q}$ a train of alternately negative and positive pulses which in conjunction with NAND gate 464 function to suppress the 1st, 3rd, 5th, 7th...outputs of NAND gate 461, providing on NAND gate output line 465 a train of sampling pulses corresponding to the 20th, 40th, 60th, 80th...clock pulses output from the clock gate 454. It is the output from the NAND gate 464 which, when suitably inverted by an inverter 466, provides on output line 467 sampling pulses which occur at the centers of the data signals.

The memory unit 470 into which is stored the sampled data signals on a serial, data signal-by-data signal basis, and from which are read the stored data signals on a parallel, character-by-character basis, includes a six-position shift register generally indicated by the reference numeral 471 which is comprised of six flip-flops 441—446. Each of the shift register flip-flops 441—446 is preferably of the type marketed by Texas Instruments, Inc., designated Model SN—7473, and includes a pair of input terminals J and K, a pair of complementary output terminals Q and $\bar{Q}$, a priming terminal CL, and a reset terminal R. A negative input to the reset terminal R of the flip-flops 441—446 places the flip-flops in a condition such that positive and negative outputs are provided at terminals $\bar{Q}$ and Q, respectively. A positive sample pulse signal input to terminal CL of a flip-flop 441—446 places the flip-flop in a set condition, storing therein a logical "1," when a negative signal is input to terminal J and a positive signal is input to terminal K. With a logical "1" stored in a flip-flop 441—446, positive and negative signals are provided at terminals $\bar{Q}$ and Q, respectively. A logical "0" is stored in the flip-flops 441—446 when positive and negative signals respectively are input to terminals J and K concurrently with the input to terminal CL of a positive sampling pulse, providing negative and positive outputs at terminals $\bar{Q}$ and Q, respectively.

The outputs Q and $\bar{Q}$ of flip-flop 441 are connected to the inputs J and K of flip-flop 442 in a manner opposite to that which the output terminals Q and $\bar{Q}$ of flip-flops 442—445 are connected to flip-flops 443—446, respectively. With the outputs and inputs of flip-flops 441—446 so connected, flip-flop 441, when in the set condition, appears to have a logical "1" stored therein as seen by flip-flop 442. When five data positions of a character have been sensed by the data ring scanning transducer 97, the logical "1" initially apparently stored in flip-flop 441 prior to initiation of the character scanning operation is stored in flip-flop 446. The presence of a logical "1" stored in flip-flop 446 signifies the completion of the storage in flip-flops 441—445 of the data signals of a character, and the positive output thereof at terminal Q can be used to gate from the flip-flops 441—445 the data signals stored therein.

The memory unit 470 further includes five NAND gates 475—479. The NAND gates 475—479 each have one input connected in common via a character readout line 491 to the output terminal Q of shift register flip-flop 446. The NAND gates 475—479 also have their respective input terminals connected to different ones of the output terminals of shift register flip-flops 441—445, respectively, in which are stored the data signals of a character upon completion of a character read cycle. In operation, when a character has been read and the logical "1" stored in flip-flop 441 shifted to flip-flop 446, and the data signals of a character stored in flip-flops 441—445, a positive character readout signal is provided at output terminal Q of shift register flip-flop 446. This character readout signal functions to enable readout NAND gates 475—479. With readout NAND gates 475—479 momentarily enabled, the outputs at terminals Q of the shift register flip-flops 441—445, in which are stored the five data signals of a character, are gated to the utilization device 421 via inverters 485—489.

A register reset circuit 447 is provided to reset the shift register upon the completion of each character readout operation. The register reset circuit 447 includes a NAND gate 458 having one input terminal connected via line 492 to the readout terminal Q of shift register position 446. The NAND gate 458 has its other input connected to output terminal D of the decade counter 448. NAND gate 458 produces via NOR gate 459 and inverter 440 a positive shift register reset signal on line 439 upon the simultaneous occurrence of a positive readout signal at terminal Q of shift register position 446, which occurs when the logical "1" initially stored in shift register 441 has been shifted to shift register 446 signifying the completion of a character read operation, and a positive signal at terminal D of decade counter 448, which indicates that some arbitrary number of clock pulses, such as eight clock pulses, have been output from the clock gate 454 subsequent to the time that the last data signal of a character has been sampled by the sampling pulse on line 467. Thus, on output line 439 of the register reset circuit 447, a positive pulse is produced which follows shortly by some arbitrary interval the readout of the shift register 471 to utilization device 421. This positive pulse is effective to reset the shift register 471 to its precharacter scan condition, wherein a logical "1" appears to be stored in shift register flip-flop 441, only after an arbitrary delay has occurred following sensing of the fifth data position of a character which is sufficient to insure that the stored data signals are properly and completely read out.

A parity error check circuit 468 is also provided. The parity circuit 468 includes the parity flip-flop 438 having a reset terminal R, an input terminal CL and an output terminal Q. The parity flip-flop 438 preferably is of the type marketed by Texas Instruments, Inc., designated Model SN-7473. A negative reset signal input to flip-flop 438 at terminal R functions to provide a negative signal level at output terminal Q. A positive signal level to reset terminal R of flip-flop 438 permits the flip-flop to switch in response to negative pulses input to terminal CL.

The parity circuit 468 also includes a NAND gate 469 having as its inputs the sample pulse line 467 and the inverted data line 431. NAND gate 469 provides on its output line 422 a negative pulse each time a logical "1" is read. The negative signals on line 422 representative of logical "1"s read from the ticket are input to terminal CL of the parity flip-flop 438.

The parity circuit 468 also includes a NAND gate 472 having one input terminal connected to output terminal Q of flip-flop 438 and the other input terminal connected via a line 474 to the output of NOR gate 473. NOR gate 473 provides an output on line 474 each time a character stored in shift register 471 is read out to the utilization device 421. Thus, the output of NOR gate 473 functions to gate the output of terminal Q of the parity flip-flop 438 following the readout of each character from the shift register 471.

If no parity error has occurred in the reading of a character, two logical "1"s are sensed, producing two noncoincident negative pulses on line 422 to input terminal CL of the parity flip-flop 438. Under such circumstances, the output signal at terminal Q of parity flip-flop 438 following reading of any given character, is at a negative level. The presence of a negative output at terminal Q of flip-flop 438 disables NAND gate 472 such that when the NAND gate 472 is sampled by the output of NOR gate 473 at the time of character readout, no negative pulse is produced on parity error line 474 indicating a parity error. However, if in the reading of any character an odd number of logical "1"s is read, an odd number of negative pulses is noncoincidently provided on line 422 to input terminal CL of flip-flop 438, causing its output terminal Q to provide a positive signal at the time of the character readout. This positive signal at terminal Q of parity flip-flop 438 is input to NAND gate 472 and produces on parity error line 474, a negative pulse indicative of a parity error when NAND gate 472 is sampled at the end of a character read operation by the output from NOR gate 473 at terminal Q.

The logic circuit 400 also includes a complete message circuit 414. The complete message circuit 414 functions to provide an output on line 406 indicative of the completion and proper reading of an entire tag. The complete message circuit 414 includes the duo-decade counter 449, preferably of the type marketed by Texas Instruments, Inc., designated Model SN-7492. Counter 449 has an input terminal CL, reset terminals R and output terminals A, B, C, and D having digital values 1, 2, 4 and 6, respectively. A positive input to reset terminals R of duo-decade counter 449 in response to return of the reset flip-flop 432 to its reset state functions to reset the duo-decade counter 449 providing negative signals at terminals A, B, C, and D, representing a count to zero. Positive signals appear at terminals A, B, C, and D of the duo-decade counter 449 in various combinations depending upon the total number of positive pulses input thereto at terminal CL via line 474 from NOR gate 473, positive pulses being produced at the rate of 1 positive pulse per character readout from the shift register 471 to the utilization device 421. The collective output of terminals A, B, C, D at any given time represents the number of characters read out to the utilization device to that point in the tag reading cycle.

The complete message circuit 414 further includes a NAND gate 480 having its inputs connected to terminals A, C and D. These terminals are simultaneously all positive only upon the presence in the duo-decade counter of a count of 11. NAND gate 480, therefore, produces a negative output signal on line 481 only when a count of 11 has accumulated in the duo-decade counter 449, indicating that all 12 characters of the ticket have been read out from the shift register 471 to the utilization device 421. It should be noted that the duo-decade counter does not transfer to 12 until the 12 character pulse is returning to zero. Therefore, the 11 count exists during the 12 character pulse time.

The complete message circuit 414 also includes a flip-flop 483. Flip-flop 483 includes a first NAND gate 484 having one input terminal connected to output line 481 of NAND gate 480 and another input terminal connected to the output terminal of a second NAND gate 482. The input of NAND gate 482 is derived from the output of NAND gate 484 and the output of the reset circuit 432 on line 436. The flip-flop 483 is placed in the reset condition by a negative signal on line 436 and when reset produces a negative output signal on the flip-flop output line 453. The flip-flop 483 is placed in the set condition representing the readout of 12 characters from the shift register 471 to the utilization device 421 when a negative signal is provided on line 481 by NAND gate 480 indicating an accumulation of a count of 11 in duo-decade counter 449 representing 12 characters.

A NAND gate 490 is also included in the complete message circuit. The NAND gate 490 is responsive to the output line 453 of flip-flop 483 on which a positive signal is provided when 12 characters have been read from the shift register 471 to the utilization device 421. The NAND gate 490 is also responsive to the output of NAND gate 450 on line 452 which is positive when a start mark is sensed. Finally, NAND gate 490 is responsive to the output at terminal Q of shift register flip-flop 443 at which a positive signal appears when the 64th data position of the information ring is sensed by the data ring scanning transducer. NAND gate 490, therefore, produces on output line 406 a negative signal indicative of a complete and proper reading of an entire tag when 12 characters have been gated from the shift register 471 to the utilization device 421, the start mark has been sensed for the second time, and the data scanning transducer is opposite the 64th data position of the information ring.

The logic circuit 400 also includes an indicator lamp flip-flop 500. The flip-flop 500 includes a first NAND gate 501 having one input connected to the end of message line 406 and the other input connected to the output of a second NAND gate 502. The NAND gate 502 has one input connected to the output of NAND gate 501 and its second input connected to line 409 of the probe flip-flop circuit 401. Under normal conditions prior to production of an end of message signal on line 406, the indicator lamp flip-flop 500 is in the reset condition by reason of the positive input to NAND gate 502 on line 409 produced as a consequence of the probe flip-flop 401 being placed in the set condition at the start of a read cycle. With the indicator lamp flip-flop 500 in the set position, a negative signal is provided at the output of NAND gate 501 to the indicator lamp 17 preventing illumination of this lamp. Upon completion of a proper and complete reading of the tag, an end of message signal is input to the NAND gate 501 on line 406 placing the indicator lamp flip-flop 500 in the set condition. With indicator flip-flop 500 in the set condition, a positive signal is output therefrom on line 505 to the indicator lamp, illuminating the lamp and thereby providing a visual indication to the operator that the tag has been completely and properly read. The indication lamp remains illuminated until the probe is returned to its normal extended position by removal of the tag from the read position. When this occurs, the probe flip-flop 401 is reset in the manner described previously, providing a negative signal on line 409 to NAND gate 502 of the indicator lamp flip-flop, resetting this flip-flop. With the indicator lamp flip-flop 500 reset, a negative signal is again output therefrom on line 505 extinguishing the indicator lamp.

OPERATION

In the reset state, before the reader probe is engaged with a ticket, the following circuit conditions exist:

A logical "1" appears to be stored in the first shift register flip-flop 441 which renders terminals $\bar{Q}$ and Q positive and negative, respectively. Shift register flip-flops 442—446 have logical "0"s stored therein placing their output terminals Q or $\bar{Q}$ in negative and positive conditions. The probe flip-flop 401 is reset, producing a negative output on line 412. This negative output is fed to the driver circuit 399, holding the scan motor 103, scan lamp 183, and timing lamp 76 in a deenergized condition. The complete message circuit 414 is reset, providing a negative end of message signal on line 406. The start flip-flop 423 has a positive output on its output line 430. The indicator lamp flip-flop 500 is reset, providing a negative signal on its output line 505, maintaining the indicating lamp 17 extinguished. The ready to transmit flip-flop 402 is reset, providing a negative signal on its output line 420. The parity flip-flop 438, clock pulse suppression flip-flop 451, reset flip-flop 432, excess sample signal suppression flip-flop 437, and counter 448 are reset.

To start a tag reading operation, the operator takes the reader and engages the probe 12 with the aligner 11 of the tag ro ticket 14. When the probe is thereafter inserted into the reader housing as a consequence of bringing the tag 14 to the read position 16, switch 165 closes, causing a negative signal to be produced on line 404 which is input to the probe flip-flop 401. This negative signal causes output of the probe flip-flop 401 on line 412 to go positive, providing a positive signal to the driver circuit 399, energizing the scan motor 103, timing lamp 76, and the scan lamp 183. The probe flip-flop circuit output on line 412 is also fed through a delay network 419 to the ready to transmit flip-flop 402, switching this flip-flop to a set state, and providing a positive output on line 420 to the utilization device 421. The ready to transmit signal must be delayed to give the scanning lamp an opportunity to become fully illuminated.

When the probe flip-flop 401 switches in response to insertion of the probe into the reader housing, the reset is lifted on the indicator lamp flip-flop 500, as well as on the reset flip-flop 432. Lifting of the reset on the indicator lamp flip-flop 500, and on the reset flip-flop 432, is not effective to switch either of these flip-flops.

As the reader scans the tag, eventually an angular position is reached in the scanning cycle wherein the start mark 27 and the data mark 34 radially aligned therewith become aligned with the start and data ring scanning transducers 98 and 97.

Wen this occurs, negative start and data signals (FIGS. 14b and 14c) are simultaneously present on lines 428 and 425. When such negative signals are present on the start and data lines 428 and 425, and the positive ready to receive signal on line 427 has been obtained from the utilization device 421, three positive signals are simultaneously input to start NAND gate 424, providing a negative output on line 452 (FIG. 14d) to NAND gate 450 and to NAND gate 433, gate 433 being associated with the reset flip-flop 432. The negative signal to the reset flip-flop 432 causes this flip-flop to be switched to a set condition, providing a positive signal on the system reset line 436 which lifts the reset to the reset register circuit 447, the parity circuit 468, the complete message circuit 414, the signal suppression flip-flop 437, the counter 448, and the counter 449. The reset flip-flop 432 when placed in the set condition also partially enables the clock NAND gate 454 by reason of the new positive output of the reset flip-flop on line 436. Also input to NAND gate 454 are the positive clock pulses (FIG. 14a) on line 455. Additionally, input to the gate 454 is the output from pulse suppression flip-flop 451. Flip-flop 451 is in a condition to respond to clock pulses input thereon on line 455 by reason of the negative output from gate 424 which is fed via line 430 through gate 450, providing a positive signal to terminal R of the flip-flop 451. The positive input at terminal R of flip-flop 451 in effect is an enabling input to the flip-flop, permitting the flip-flop to respond to the clock pulses on line 455.

With the flip-flop 451 enabled, the first trailing edge of the first clock pulse thereafter appearing on line 455 and input to terminal CL of flip-flop 451 causes the output (FIG. 14e) of the flip-flop to initiate production of a negative signal at its output terminal $\bar{Q}$. The negative output at terminal $\bar{Q}$ remains negative until flip-flop 451 is switched by the trailing edge of the second clock pulse input thereto on line 455 whereupon output terminal $\bar{Q}$ goes positive. The net result of feeding clock pulses (FIG. 14a) form line 455 to flip-flop 451 is that negative pulses (FIG. 14d) are produced on flip-flop output line $\bar{Q}$ having a repetition rate which is one-half of the repetition rate of the clock pulses on line 455. These negative clock pulses output at terminal $\bar{Q}$ of flip-flop 451 suppress simultaneously occurring positive clock (FIG. 14a) pulses input to clock gate 454 on line 455. Thus, only alternate ones of the clock pulses on line 455 are gated by gate 454 (FIG. 14f) so long as flip-flop 451 is responding to clock signals. Hence, flip-flop 451 only responds to clock signals on line 455 during the duration of the start mark 27 and data mark 34 aligned therewith; clock signals are only suppressed during the sensing of these marks. Thereafter, the flip-flop 451 is reset, providing a positive signal at its output terminal $\bar{Q}$, continuously enabling gate 454.

Assuming the start and data signals are six clock pulses wide, the flip-flop 451 provides three negative signals (FIG. 14e) to the gate 454, blocking three of the positive clock pulses (FIG. 14a) on line 455, namely, clock pulses 2, 4, and 6, the clock pulse 1 being defined as the first clock pulse occurring after the beginning of the start and data signals. Clock pulses 1, 3, and 5 (FIG. 14f) are gated to counter 448. Thus, at the end of the six clock pulse wide start and data signals, counter 448 has accumulated a count of three corresponding to one-half of the pulses of the start and data signals. Thereafter, as scanning continues, all clock pulses on line 455 are gated to counter 448 by gate 454 which is now continuously enabled by the reset flip-flop 432. When the counter 448 accumulates a count of nine, the flip-flop 437 is set, placing a positive signal (FIG. 14g) at output terminal $\bar{Q}$ which is input to gate 464. Since the flip-flop 437 switches at the trailing edge of the input thereto at terminal CL, the gate 464 is enabled (FIG. 14h) at the trailing edge of the nine count in counter 448, the ninth clock pulse gated by gate 461 to gate 464 is not gated through gate 464. However, gate 464 is enabled during the 19th clock pulse and accordingly the 19th clock pulse (FIG. 14i) is gated therethrough, providing on line 467 a data sampling pulse. Following gating of the 19th clock pulse by gate 464, the flip-flop 437 is switched, specifically, as the trailing edge of the 19th clock pulse, flip-flop 437 is switched, preventing the gate 464 from gating the 29th clock pulse therethrough.

The data sampling pulse is input to all of the flip-flops 441—446 of the shift register 471. The positive data sampling pulse coincident with the 19th clock pulse gated by NAND gate 454 switches the first flip-flop 441 of the shift register 471, transferring the contents thereof, a logical "1," to the second shift register flip-flop 442 via output terminal $\bar{Q}$. The second register position flip-flop 442, therefore, has a logical "1" stored therein. A logical "1" is reflected as a positive output at terminal Q of the second register flip-flop 442. Simultaneously with the occurrence of the data sampling pulse at the 19th clock count, information is available on the complementary data lines of the first shift register flip-flop 441. By 19th clock count, 29th clock count, etc., as used herein, is meant the point in time when the gate 454 has gated its 19th, 29th, etc., pulse. If the first data position A is a logical "1," negative and positive signals are input to terminals J and K of the first register flip-flop 441 which is effective to store therein a logical "1." If the first data position A of the first character is a logical "0," positive and negative signals are input to terminals J and K of flip-flop 441, storing therein a logical "0."

It is important to note that prior to entry of any data in the shift register 471, all six flip-flops 441—446 of the shift register are in the identical condition, namely, the reset condition. However, as viewed by the second flip-flop 442, the first flip-flop 441 appears to have a logical "1" stored therein because its output terminals Q and $\bar{Q}$, which are input to the second register flip-flop 442 are reversely connected relative to the connections which the outputs Q and $\bar{Q}$ of the flip-flops 442—445 make with the inputs J and K of the flip-flops 443—446. Accordingly, even though the first flip-flop 441 is reset, the second shift register flip-flop 442 sees a logical "1" stored therein, and when the 19th clock pulse is gated by gate 454, a logical "1" is entered into the second shift register flip-flop 442.

Assuming a logical "1" (FIG. 14c) is present in the first data position A of character group 37 as depicted in FIG. 12 only, negative and positive signals are input to the J and K terminals of the first register flip-flop 441. At this point, the first register flip-flop 441 has a logical "1" stored therein, as does the second register position 442. Register flip-flops 443—446 have logical "0"s stored therein.

The 29th clock th output from gate 454 causes counter 448 to provide an output (FIG. 14g) which switches flip-flop 437, providing output (FIG. 14h) at flip-flop terminal $\bar{Q}$ which is effective to enable gate 464 so it can pass the output of the counter 448 coincident with the 39th clock pulse gated by gate 454. The output of the counter 448 coincident with the 39th clock pulse gated by gate 454 is gated by gate 464, producing a data sampling signal (FIG. 14i) on line 467. The output of counter 448 coincident with the 39th clock pulse gated by gate 454 also disables gate 464, thereby preventing the output of counter 448 coincident with the 49th clock pulse gated by gate 454 from being gated through gate 464.

The output (FIG. 14g) of counter 448 occurring coincidentally with the 39th clock pulse gated by gate 454 is input to all of the shift register flip-flops 441—446, causing the logical "1"s present in first and second register flip-flops 441 and 442 to be transferred to the second and third register flip-flops 442 and 443. Since a logical "0" (FIG. 14c) is present in the second data position B of the first character, positive and negative signals are input to terminals J and K of the first shift register flip-flop 441, causing this flip-flop to switch states to store a logical "0" therein, a logical "1" having been previously stored therein.

As the scanning cycle continues, the 49th clock pulse gated by gate 454 is input to counter 448, causing this counter to produce an output (FIG. 14g) which in turn is effective to switch flip-flop 437. Since flip-flop 437 is placed in an enabled state (FIG. 14h) at a time coincident with the trailing edge of the 49th clock pulse gated by gate 454, the 49th clock pulse is not gated through gate 464 and a data sampling pulse is not generated on line 467.

Continued scanning eventually causes a 59th clock pulse to be gated by gate 454, and produce an output (FIG. 14g) from counter 448. This output is gated by enabled gate 464 (FIG. 14h) to produce a data sampling signal (FIG. 14i) on line 467. This data sampling pulse is input to the shift register flip-flops 441—446 and effective to transfer the contents from the various shift register positions to the succeeding shift register positions. At this time, the 0, 1, 1 in register flip-flops 441—443 are transferred to the register flip-flops 442—444, respectively. Since there is no data mark in the third data position C of the first character, a logical "0" (FIG. 14c) is input to the first shift register flip-flop 441. The logical "0" is ineffective to change the state of the first shift register flip-flop 441 since it previously had stored therein a logical "0." Consequently, the first shift register flip-flop 441 continues to store a logical "0." Flip-flop 437 is thereafter switched to disable gate 464 by the trailing edge of the output from counter 448 generated as a consequence of the 59th clock pulse gated by gate th With gate 464 disabled, the output of counter 448 produced by the 69th clock pulse gated by gate 454 is not gated by gate 464 to produce a sample data pulse.

When the output (FIG. 14g) of counter 448 produced by the 69th clock pulse gated by gate 454 arrives, it is blocked by the disabled gate 464 (FIG. 14h). The trailing edge of this output switches flip-flop 437, enabling gate 464 to gate the output of counter 448 produced by the 79th clock pulse gated through gate 454. When the 79th clock pulse is gated by gate 454, the output of counter 448 (FIG. 14g) produced thereby is gated by enabled gate 464 (FIG. 14h) to produce on line 467 (FIG. 14i) a data sampling pulse. This pulse is input to the shift register 471, transferring the contents of the flip-flops 441—445 to flip-flops 442—446. The second register flip-flop 442 is not switched and contains a logical "0" as it did before. The third register flip-flop 443 is switched and stores a logical "0," this register having stored a logical "1" before. The fourth register flip-flop 444 is not switched and continues to store a logical "1." The fifth register flip-flop 445 is switched, storing a logical "1." The sixth register flip-flop 446 continues to store a logical "0." Since a data mark (FIG. 14c) is present in data position D of the first character, a logical "1" is presented to the first shift register flip-flop 441. This logical "1" is manifested by negative and positive signals at terminals J and K, causing the first shift register flip-flop 441 to switch and store a logical "1," a logical "0" previously having been stored therein.

As scanning continues, an output (FIG. 14g) is produced by counter 448 by the 89th clock pulse gated by gate 454. This output is not gated by gate 464 (FIG. 14h) to produce a data sampling pulse because gate 464 is disabled, this gate having been rendered disabled by the trailing edge of the previous output of counter 448 produced by the 79th clock pulse gated by gate 454. The output of counter 448 produced by the 89th clock pulse gated by gate 454 is effective by reason of its trailing edge to switch the flip-flop 437 and enable gate 464 an permit it to subsequently gate the output of counter 448 produced by the 99th clock pulse gated by gate 454. When the 99th clock pulse is gated by gate 454 (FIG. 14h) to produce an output form counter 448 (FIG. 14g), the output is gated through gate 464 and the data sampling pulse (FIG. 14i) produced thereby is input to the shift register 471, transferring the contents of the register. This transfer causes a 1, 0, 0, 1, 1 to be stored in flip-flops 442—446, respectively Since there is not a data mark (FIG. 14c) present in the fifth data position E, a logical "0" is input to the first register flip-flop 441.

Upon conclusion of the 99th clock pulse gated by gate 454, and transfer of a "1" from the fifth register flip-flop 445 to the sixth register flip-flop 446, an output (FIG. 14j) is provided at terminal Q of the sixth register flip-flop. This output is effective to gate the contents of the register flip-flops 441—445 to the utilization device 421.

When data is read out from the shift register 471 to the utilization device 421, a signal is provided by NOR gate 473 which is input to the end of message circuit 414, providing a count of one in the character counter 449.

The output (FIG. 14j) from terminal Q of the sixth register flip-flop 446, which gated the information to the utilization device, also functions as an end of character signal and is input to the reset register circuit 447 where it is ineffective to enable NAND gate 458. Eight clock pulse is gated later corresponding to the time the 108th clock pulse is gated by gate 454, an output form counter 448 is received which is input to NAND gate 461. This input causes a register reset pulse (FIG. 14k) to be produced on line 467 by the register reset circuit 447, resetting the flip-flops 441—446 of the shift register.

As successive characters are read out to the utilization device 421 from the register 471 at clock counts of 199, 299, 399, 499, 599, 699, 799, 899, 999, and 1099, and 1199, by the output provided at terminal Q of the sixth register flip-flop 446, the register flip-flops 441—446 are successively reset in parallel by successive outputs from the register reset circuit 447 and the counter 449 of the end of message circuit 414 is successively advanced by counts of one. At the count of 1199, 12 characters have been read and input to the utilization device, and the character counter 449 has accumulated a count of 12. Upon accumulation of a count of 12, the counter 449 provides an input to flip-flop 483 which in turn provides an input to NAND gate 490. This input, in combination with inputs from terminal Q to shift register 443 and NAND gate 450 reflecting the sensing of the 64th data position and the start mark for the second time, causes the complete message circuit 414 to provide an output on line 406. This output is input to the probe flip-flop 401, resetting this flip-flop. Resetting of the flip-flop 401 produces a signal on line 412 which deenergizes the scan lamp and motor circuit 399, resets the ready to transmit flip-flop 402, and resets the reset flip-flop 432. The output of the reset flip-flop 432 disables NAND gate 454 blocking clock pulses from being input to the counter 448, resets the flip-flop 437, resets the reset register circuit 447, resets the parity flip-flop 438, and the end of message flip-flop 483, resets the counter 448, and the character counter 449.

If the tag is prematurely moved away from the read station and the probe extended to its normal nonread position, the input signal from the probe switch on line 404 goes positive, causing the probe flip-flop 401 to reset, providing a negative output signal on line 412. The negative output signal on line 412 deenergizes the scan motor and lamp circuit 399, as well as resets the ready to transmit flip-flop 402 and the reset flip-flop 432. The reset flip-flop 432, when reset, produces a negative output which constitutes the system reset signal, and resets the remainder of the circuit.

Having described my invention, I claim:

1. Apparatus for reading a tag having photosensible mark-receiving positions arranged in at least one circular pattern symmetrically relative to an aligner formed on the tag, said apparatus comprising:

a support, means mounted on said support and cooperable with said aligner for properly locating a tag in a read position, sensing means rotatably mounted to said support in photosensing relationship to the circular pattern of a tag located at said read position for sequentially photosensing the mark-receiving positions of said pattern, unitary clock signal generating means, including a clock member rotatably mounted on said support for rotation in synchronism with said sensing means for generating clock signals at a rate constituting a specified multiple of the rate at which said mark-receiving positions are sequentially photosensed by said sensing means, common drive means for concurrently initiating rotation of, and synchronously rotating, said sensing means and said clock member for causing said clock member of said unitary clock signal generating means to continuously generate clock signals throughout said entire sequential photosensing beginning with initiation of rotation of said clock member, and sampling means responsive to said clock signals and a single sensing of start mark information located in said circular scan path on said tag for producing sampling signals in synchronism with only selected one of said clock signals.

2. Apparatus for reading a tag having photosensible mark-receiving positions arranged in at least one circular pattern symmetrically relative to an aligner formed on the tag, said apparatus comprising:

a support, means mounted on said support and cooperable with said aligner for properly locating a tag in a read position, sensing means rotatably mounted to said support in photosensing relationship to said circular pattern of a tag located at said read position for sequentially photosensing the mark-receiving positions of said pattern, unitary clock signal generating means, including a clock member rotatably mounted on said support for rotation in synchronism with said sensing means for continuously generating clock signals during said entire sequential photosensing at a rate constituting a specified multiple of the rate at which said mark-receiving positions are sequentially photosensed by said sensing means, and sampling means responsive to said clock signals and to a single sensing of start mark information located in said circular scan path on said tag for producing sampling signals in synchronism with only selected ones of said clock signals.

3. The method of generating sampling signals in synchronism with the sequential photosensing of circularly arranged mark-receiving positions located on a tag to facilitate sampling of signals produced when the marks are sensed by a reader having a transducer movable relative to a tag which is properly located at a read station by alignment means associated therewith, comprising the steps of:

rotating in a circular path a scanning transducer arranged in photosensing relationship to said mark-receiving positions of a tag to thereby sequentially sense marks in said mark-receiving positions, rotating a clock member in synchronism with said scanning transducer and in response thereto continuously generating clock signals during said entire sequential sensing at a rate constituting a specified multiple of the rate at which said mark-receiving positions are sequentially photosensed by said sensing means, generating, in response to said clock signals and a single sensing of start mark information on said tag located in said circular scan path, sampling signals in synchronism with only selected ones of said clock signals and processing said sampling signals an the output of said scanning transducer to provide samples of said transducer output which are in synchronism with the rotational movement of said scanning transducer relative to said circularly arranged mark-receiving positions on said tag.

4. The method of generating sampling signals in synchronism with the sequential photosensing of circularly arranged mark-receiving positions located on a tag to facilitate sampling of signals produced when the marks are sensed by a reader having a transducer movable relative to a tag which is properly located at a read station by alignment means associated therewith, comprising the steps of:

initiating rotation, and continuously rotating, in a circular path, a scanning transducer arranged in photosensing relationship to said mark-receiving positions of a tag to thereby sequentially sensed marks in said mark-receiving positions, initiating rotation, and continuously rotating, a clock member in synchronism with said initiation of rotation, and continuous rotation of, said scanning transducer and in response thereto initiating and continuously generating clock signals during said entire sequential sensing, starting with said initiation of rotation of said transducer and clock member, at a rate constituting a specified multiple of the rate at which said mark-receiving positions are sequentially photosensed by said sensing means, generating, in response to said clock signals and a single sensing of start mark information on said tag located in said circular scan path, sampling signals in synchronism with only selected ones of said clock signals and processing said sampling signals and the output of said scanning transducer to provide samples of said transducer output which are in synchronism with the rotational movement of said scanning transducer relative to said circularly arranged mark-receiving positions on said tag.